United States Patent
Lokhandwala

[11] Patent Number: 5,964,923
[45] Date of Patent: Oct. 12, 1999

[54] NATURAL GAS TREATMENT TRAIN

[75] Inventor: Kaaeid A. Lokhandwala, Union City, Calif.

[73] Assignee: Membrane Technology and Research, Inc., Menlo Park, Calif.

[21] Appl. No.: 08/892,360

[22] Filed: Jul. 14, 1997

Related U.S. Application Data

[63] Continuation-in-part of application No. 08/608,743, Feb. 29, 1996, Pat. No. 5,669,958, and a continuation-in-part of application No. 08/608,707, Feb. 29, 1996, Pat. No. 5,647,227.

[51] Int. Cl.[6] ............................. B01D 53/22; B01D 53/26
[52] U.S. Cl. ........................ 95/50; 95/39; 95/52; 95/117; 95/235; 95/236; 96/9; 96/108
[58] Field of Search .................... 95/39, 45, 47–55, 95/117, 131, 135–137, 235, 236, 288; 96/4, 7–14, 108

[56] References Cited

U.S. PATENT DOCUMENTS

| | | | |
|---|---|---|---|
| 4,130,403 | 12/1978 | Cooley et al. | 55/16 |
| 4,374,657 | 2/1983 | Schendel et al. | 62/19 |
| 4,466,946 | 8/1984 | Goddin, Jr. et al. | 423/228 |
| 4,511,382 | 4/1985 | Valencia et al. | 62/20 |
| 4,529,411 | 7/1985 | Goddin, Jr. et al. | 55/16 |
| 4,595,405 | 6/1986 | Agrawal et al. | 62/18 |
| 4,599,096 | 7/1986 | Burr | 62/27 |
| 4,602,477 | 7/1986 | Lucadamo | 62/24 |
| 4,639,257 | 1/1987 | Duckett et al. | 55/16 |
| 4,654,063 | 3/1987 | Auvil et al. | 62/18 |
| 4,681,612 | 7/1987 | O'Brien et al. | 62/23 |
| 4,687,498 | 8/1987 | Maclean et al. | 62/17 |
| 4,689,062 | 8/1987 | Maclean et al. | 62/18 |
| 4,718,921 | 1/1988 | Makino et al. | 55/16 |
| 4,755,193 | 7/1988 | Higashimura et al. | 55/16 |
| 4,793,841 | 12/1988 | Burr | 62/27 |
| 4,857,078 | 8/1989 | Watler | 55/16 |
| 4,936,887 | 6/1990 | Waldo et al. | 62/24 |
| 5,002,590 | 3/1991 | Friesen et al. | 55/16 |
| 5,013,338 | 5/1991 | Anand et al. | 55/158 |
| 5,067,971 | 11/1991 | Bikson et al. | 55/16 |
| 5,071,451 | 12/1991 | Wijmans | 55/16 |
| 5,089,033 | 2/1992 | Wijmans | 55/16 |
| 5,199,962 | 4/1993 | Wijmans | 55/16 |
| 5,205,843 | 4/1993 | Kaschemekat et al. | 95/16 |
| 5,240,472 | 8/1993 | Sircar | 95/52 |
| 5,281,255 | 1/1994 | Toy et al. | 96/50 |
| 5,352,272 | 10/1994 | Moll et al. | 96/9 |
| 5,374,300 | 12/1994 | Kaschemekat et al. | 95/39 |
| 5,401,300 | 3/1995 | Lokhandwala et al. | 95/49 |
| 5,407,467 | 4/1995 | Lokhandwala et al. | 95/49 |
| 5,414,190 | 5/1995 | Förg et al. | 585/802 |
| 5,647,227 | 7/1997 | Lokhandwala | 95/50 X |
| 5,669,958 | 9/1997 | Baker et al. | 95/50 |
| 5,688,307 | 11/1997 | Pinnau et al. | 95/50 |

OTHER PUBLICATIONS

Gottschlich et al., "Energy Minimization of Separation Processes using Conventional Membrane/Hybrid Systems," Final Report to DOE, 1990.

(List continued on next page.)

Primary Examiner—Robert Spitzer
Attorney, Agent, or Firm—J. Farrant

[57] ABSTRACT

A process train for treating a gas stream containing methane, nitrogen, and at least one of water vapor, acid gas, $C_{3+}$ hydrocarbons and aromatic hydrocarbons, the gas stream typically, but not necessarily, being natural gas. The treatment train includes separation of methane from nitrogen by means of membranes that preferentially permeate methane and reject nitrogen. Preferred processes include both a dehydration step and an NGL removal step to treat the gas before it passes to the methane/nitrogen membrane separation step. The process train can also include additional steps, such as an acid gas removal step, or a cryogenic methane/nitrogen separation step.

36 Claims, 11 Drawing Sheets

OTHER PUBLICATIONS

Tanaka et al., "Permeability and Permselectivity of Gases in Fluorinated and Non–Fluorinated Polyimides," Polymer, vol. 33, p. 585, 1992.

Coleman et al., "The Transport Properties of Polyimide Isomers Containing Hexafluoroisopropylidene in the Diamine Residue," J. Memb. Sci., vol. 50, p. 1915, 1990.

Kim et al. "Relationship Between Gas Separation Properties and Chemical Structure in a Series of Aromatic Polyimides," J. Memb. Sci., vol. 37, p. 45, 1988.

Stern et al., "Structure–Permeability Relationships in Silicone Polymers," J., Polymer Sci., vol. 25, p. 1263, 1987.

Koros et al., "Sorption and Transport of Various Gases in Poly–Carbonate," J. Memb. Sci., vol. 2, p. 165, 1977.

Plate et al., "Gas and Vapor Permeation and Sorption in Poly(trimethylsilylpropyne)," J. Memb. Sci., vol. 60, p. 13, 1991.

Baker et al., "Nitrogen Separation from Natural Gas Using Membranes," Presented to AIChE, Houston, TX, Feb. 1993.

Toy et al., "Gas Transport Through Poly(1–Trimethylsilyl–1–Propyne) Membranes in the Presnece of Organic Vapors," Presented at NAMS, Breckenridge, CO, May 1994.

Pinnau, "Membrane Material Selection for the Separation of Condensable Gases," Presented at GKSS Research Center, Sep. 1995.

Pinnau et al., "Poly(1–Trimethylsilyl–1–Propyne)—Superglassy Polymer w/ Extraordinary Properties for Sep. of Organic Vapors from Permanent Gases," Presented at NAMS, Portland, OR, May 1995.

NATURAL GAS TREATMENT TRAIN

This application is a continuation-in-part of application Ser. No. 08/608,743, filed on Feb. 29, 1996, now U.S. Pat. No. 5,669,958, and application Ser. No. 08/608,707, filed on Feb. 29, 1996, now U.S. Pat. No. 5,647,227, both incorporated herein by reference in their entirety.

FIELD OF THE INVENTION

The invention is a natural gas treatment train including at least two of a dehydration step, an NGL recovery step and a nitrogen/methane membrane-based gas separation step.

BACKGROUND OF THE INVENTION

Fourteen percent of known U.S. natural gas reserves contain more than 4% nitrogen. The bulk of these reserves cannot be exploited because no economical technology for removing the nitrogen exists.

Cryogenic distillation is the only process being used to date on any scale to remove nitrogen from methane in natural or associated gas. Twelve such plants are believed to be in operation in the U.S., for example in enhanced oil recovery, where nitrogen is used to pressurize the formation and tends to build up in the associated gases removed with the oil. The gas streams that have been treated by cryogenic separation contain relatively large amounts of nitrogen, such as more than 10 vol %. Cryogenic plants can be cost effective in these applications because all the separated products have value. The propane, butane and heavier hydrocarbons can be recovered as natural gas liquids (NGL), the methane/ethane stream can be delivered to the gas pipeline and the nitrogen can be reinjected into the formation.

Cryogenic plants are not used more widely because they are expensive and complicated. A particular complication is the need for significant pretreatment to remove water vapor, carbon dioxide, and $C_{3+}$ hydrocarbons and aromatics to avoid freezing of these components in the cryogenic section of the plant, which typically operates at temperatures down to $-150°$ C. The degree of pretreatment is far more elaborate and the demands placed upon it are far more stringent than would be required to render the gas acceptable in the pipeline grid absent the excess nitrogen content. For example, pipeline specification for water vapor is generally about 120 ppm; to be fit to enter a cryogenic plant, the gas must contain no more than 1–2 ppm of water vapor at most. Similarly, 2% carbon dioxide content may pass muster in the pipeline, whereas carbon dioxide may be present only at the level of 100 ppm or less for cryogenic separation.

Other processes that have been considered for performing this separation include pressure swing adsorption and lean oil absorption; none is believed to be in regular industrial use.

Gas separation by means of membranes is known. For example, numerous patents describe membranes and processes for separating oxygen or nitrogen from air, hydrogen from various gas streams and carbon dioxide from natural gas. Such processes are in industrial use, using glassy membranes. Rubbery membranes are used to separate organic components from air or other gas mixtures, such as in resource recovery and pollution control.

It is also known to combine membrane separation with cryogenic distillation. For example, the following U.S. patents show such processes for the separation of carbon dioxide from methane: 4,529,411; 4,511,382; 4,639,257; 4,599,096; 4,793,841; 4,602,477; 4,681,612; 4,936,887 and 5,414,190. U.S. Pat. No. 4,374,657 shows a combination of cryogenic distillation and membrane separation for separating ethane from carbon dioxide. U.S. Pat. No. 4,654,063 shows cryogenic separation followed by membrane separation for separating hydrogen from other gases. U.S. Pat. No. 4,595,405 shows a similar arrangement for separation of nitrogen and oxygen from air. U.S. Pat. Nos. 4,687,498 and 4,689,062 show process designs combining membrane separation and cryogenic distillation for recovery of argon from ammonia plant purge gas mixtures.

A report by SRI to the U.S. Department of Energy ("Energy Minimization of Separation Processes using Conventional Membrane/Hybrid Systems", D. E. Gottschlich et al., Final Report under Contract number DE 91-004710, 1990) suggests that separation of nitrogen from methane might be achieved by a hybrid membrane/pressure swing adsorption system. The report shows and considers several designs, assuming that a hypothetical nitrogen-selective membrane, with a selectivity for nitrogen over methane of 5 and a transmembrane methane flux of $1\times10^{-6}$ cm$^3$(STP)/cm$^2$·s·cmHg, were to become available, which to date it has not.

In fact, there are several difficulties associated with separating nitrogen from methane by means of membranes, the main one being the absence of membranes with a useful selectivity. Both glassy and rubbery membranes have poor selectivities for nitrogen over methane or methane over nitrogen. Table 1 lists some representative values.

TABLE 1

| | Permeability (Barrer) | | Selectivity (−) | | |
|---|---|---|---|---|---|
| | $N_2$ | $CH_4$ | $N_2/CH_4$ | $CH_4/N_2$ | Ref. |
| Polyimide (6FDA-mp'ODA) | 0.26 | 0.13 | 2.1 | 0.5 | 1 |
| Polyimide (6FDA-BAHF) | 3.10 | 1.34 | 2.3 | 0.4 | 1 |
| Polyimide (6FDA-IPDA) | 1.34 | 0.70 | 1.9 | 0.5 | 2 |
| Polyimide (6FDA-MDA) | 0.20 | 0.10 | 2.0 | 0.5 | 3 |
| Cellulose acetate | 0.35 | 0.43 | 0.8 | 1.2 | 4 |
| Polycarbonate | 0.37 | 0.45 | 0.8 | 1.2 | 4 |
| Polysulfone | 0.14 | 0.23 | 0.6 | 1.7 | 4 |
| Poly(dimethylsiloxane-dimethylstyrene) | 103 | 335 | 0.3 | 3.3 | 4 |
| Poly(dimethylsiloxane) | 230 | 760 | 0.3 | 3.3 | 4 |
| Poly(siloctylene-siloxane) | 91 | 360 | 0.25 | 4.0 | 5 |
| Poly(p-silphenylene-siloxane) | 3 | 12 | 0.25 | 4.0 | 5 |
| Polyamide-polyether copolymer | 4.8 | 20 | 0.24 | 4.2 | 4 |

1 Barrer = $10^{-10}$ cm$^3$ (STP) · cm/cm$^2$ ·s · cmHg
References for table:
1. K. Tanaka, H. Kita, M. Okano, and K. Okamoto, "Permeability and Permselectivity of Gases in Fluorinated and Non-fluorinated Polyimides," Polymer33, 585 (1992).
2. M. R. Coleman and W. J. Koros, "Isomeric Polyimides Based on Fluorinated Dianhydrides and Diamines for Gas Separation Applications," J.Memb.Sci.50, 285 (1990).
3. T. H. Kim, W. J. Koros, C. R. Husk, and K. C. O'Brien, "Relationship Between Gas Separation Properties and Chemical Structures in a Series of Aromatic Polyimides," J.Memb.Sci.37, 45 (1988).
4. J. G. Wijmans, "Membrane Processes and Apparatus for Removing Vapors from Gas Streams," U.S. Pat. No. 5,071,451 (December 1991).
5. S. A. Stern, V. M. Shah, and B. J. Hardy, "Structure Permeability Relationships in Silicone Polymers," J.PolymerSci:PolymerPhysicsEd.25, 1263, (1987).

These separation properties are not good enough to make membrane separation practical for this gas pair. With a nitrogen-selective membrane, we have calculated that a nitrogen/methane selectivity of about 15 is needed for a practical process that achieves adequate nitrogen removal and at the same time that avoids losing excessive amounts of methane into the permeate stream.

U.S. Pat. No. 5,352,272, to Dow Chemical, concerns operation of glassy membranes at subambient temperatures to improve selectivity for one gas over another. To achieve an acceptable selectivity for nitrogen over methane using known membrane materials would need an increase over the room-temperature selectivities shown in Table 1 of at least five-fold and more probably seven-fold or eight-fold. It is probable that the methane in the stream would liquefy before a low enough temperature to achieve this selectivity could be reached. Also, in glassy membranes, permeability, which is dominated by the diffusion coefficient, declines with decreasing temperature, so permeabilities, already low, would rapidly decline to an unacceptably low value.

Membrane separations are usually driven by a pressure difference between the feed and permeate sides, the feed side being at high pressure with respect to the permeate side. With a methane-selective membrane, if the bulk of the gas stream being treated has to pass to the permeate low-pressure side, then be recompressed, it is to be expected that this would make for an inefficient and hence costly process. Likewise, the membrane area that is needed to perform the separation is in proportion to the amount of gas that must cross the membrane; if most of the gas in the feed has to permeate the membrane, a much larger membrane area will be needed than if only a few percent of the feed gas has to permeate.

Thus, the separation of nitrogen from methane by means of membranes is a very difficult problem. U.S. Pat. No. 5,669,958 teaches such a separation, accomplished by operating a methane-selective membrane at a low temperature. U.S. Pat. No. 5,647,227 teaches the use of a similarly operated methane-selective membrane in conjunction with cryogenic distillation of nitrogen from methane.

Of course, most raw natural gas that is out of specification in terms of excess nitrogen content will also be out of specification with regard to at least one other component, such as water vapor, acid gas (carbon dioxide and/or hydrogen sulfide) and $C_{3+}$ hydrocarbons. As a result, treatment trains are required that provide appropriate, consistent and integrated treatments for multiple contaminants.

SUMMARY OF THE INVENTION

The invention is a process train, including a membrane gas-separation step, for treating a gas stream containing methane, nitrogen, and at least one of water vapor, acid gas, $C_{3+}$ hydrocarbons and aromatic hydrocarbons, the gas stream typically, but not necessarily, being natural gas.

The separation of nitrogen from methane is performed by a membrane separation step as follows:

(a) providing a membrane having a feed side and a permeate side and being selective for methane over nitrogen;

(b) passing the gas stream to be treated across the feed side of the membrane at a selected temperature or a temperature at which the membrane exhibits a target selectivity for methane over nitrogen;

(c) withdrawing from the feed side a residue stream depleted in methane and enriched in nitrogen compared with the raw gas stream;

(d) withdrawing from the permeate side a permeate stream enriched in methane and depleted in nitrogen compared with the raw gas stream.

Thus, the nitrogen/methane membrane separation part of the total separation process of the invention works by preferentially permeating methane and rejecting nitrogen, that is, usually the major component of the stream is permeated and the minor component is rejected. Unexpectedly, we have found that the process is able to meet natural gas pipeline specifications for nitrogen, with only a small methane loss, and, despite the need to recompress the methane-rich permeate, can be cost effective in a number of applications.

To achieve useful separation results, the membranes should preferably be operated at a temperature no higher than about 0° C. and/or should exhibit a methane/nitrogen selectivity of at least about 4, more preferably about 5 or more. We have found that such a target selectivity can be achieved for rubbery materials by cooling, preferably down to no more than about −50° C. Furthermore, this selectivity is accompanied by high methane transmembrane flux, such as at a very minimum at least about $1 \times 10^{-6}$ cm$^3$(STP)/cm$^2$·s·cmHg, preferably at least $1 \times 10^{-5}$ cm$^3$(STP)/cm$^2$·s·cmHg and more preferably at least $1 \times 10^{-4}$ cm$^3$(STP)/cm$^2$·s·cmHg.

The methane/nitrogen separation step can be carried out with three types of membranes. The first is rubbery membranes. The second is membranes made from the so-called "super-glassy" polymers, defined and described in the Detailed Description of the Invention below, that exhibit anomalous behavior for glassy materials in that they preferentially permeate larger, more condensable molecules over smaller, less condensable molecules. The third type is finely microporous inorganic membranes, such as carbon membranes or ceramic membranes.

Preferably, at least a portion of the cooling required to produce adequate selectivity is obtained by expanding the reject nitrogen stream and using this to chill the incoming feed stream. The methane/nitrogen separation process may be carried out in one or multiple membrane stages and the membrane separation may be augmented by other nitrogen/methane separation techniques, such as absorption, adsorption or distillation.

One particular advantage of the invention is that the membranes used for methane/nitrogen separation are not damaged by water or hydrocarbons. This gives considerable flexibility of process design and in some cases may simplify the number of steps required in the total treatment train. Furthermore the membranes are selectively permeable to water, hydrocarbons and acid gases over nitrogen, so that these components will be removed from the feed stream and concentrated with the methane in the permeate stream.

The treatment train of the invention involves subjecting the gas stream to an additional separation step upstream or downstream of the membrane nitrogen/methane separation process to remove at least a portion of water vapor, $C_{3+}$ hydrocarbons, aromatic hydrocarbons, carbon dioxide or hydrogen sulfide. This additional separation step may be a membrane separation step or a non-membrane separation step, and may be carried out on the feed stream on its way to the nitrogen/methane separation membranes, or on the permeate or residue streams from the membrane.

Although the invention embraces many possible combinations of membrane-based methane/nitrogen separation with other treatments, certain specific combinations are particularly useful.

Raw natural gas always contains at least a little water vapor or entrained water. The typical water content of raw gas is up to about 1,200 ppm; on the other hand, pipeline specification is typically below 140 ppm. Thus, it is common that the gas has to be reduced in water content by as much as 90% or more before it enters the pipeline. Furthermore, since the methane/nitrogen membrane separation step is normally carried out at sub-zero temperatures, it is important to reduce the dewpoint of the gas before cooling it to that temperature, to avoid freezing in the feed lines to the membrane system or in the membrane equipment itself. Thus, embodiments of the invention that include a dehydration step of some type followed by membrane separation of methane from nitrogen are advantageous and preferred.

Similarly, it is commonplace to remove at least a portion of the $C_{3+}$ hydrocarbons from raw natural gas to control the dewpoint or Btu value of gas. Thus embodiments of the invention that include an NGL removal step of some type followed by membrane separation of methane from nitrogen are advantageous and preferred.

Most preferred is to include both a dehydration step and an NGL removal step to treat the gas before it passes to the methane/nitrogen membrane separation step. In this case, the process of the invention comprises:

(a) removing water to produce a drier gas stream;

(b) removing $C_{3+}$ hydrocarbons from the drier gas stream to produce a lighter gas stream;

(c) providing a membrane having a feed side and a permeate side and being selective for methane over nitrogen;

(d) passing the lighter gas stream across the feed side of the membrane at a temperature no higher than about 0° C.;

(e) withdrawing from the feed side a residue stream depleted in methane and enriched in nitrogen compared with the lighter gas stream;

(f) withdrawing from the permeate side a permeate stream enriched in methane and depleted in nitrogen compared with the lighter gas stream.

Additional steps, such as an acid gas removal step, may be included in this most preferred process train as desired. Also, the unit operations that make up the key elements of the process train may be connected directly, or indirectly through other operations, as convenient.

The most preferred process train can optionally include a cryogenic methane/nitrogen distillation unit following the methane/nitrogen membrane separation step, so that the other steps form a simple pretreatment set. In this regard, it has the advantages identified in U.S. Pat. No. 5,647,227, namely that it can substantially reduce the load on the cryogenic unit and avoid overprocessing.

It is an object of the invention to provide gas treatment trains that include a membrane separation step for separation of nitrogen from methane.

It is an object of the invention to provide gas treatment trains that include a dehydration step, an NGL removal step, and a membrane separation step for separation of nitrogen from methane.

It is an object of the invention to provide membrane processes for separation of nitrogen from methane that can withstand the presence of secondary contaminants in the feed gas stream.

It is an object of the invention to provide gas treatment trains that provide improved pretreatment of gas streams subject to cryogenic distillation.

Additional objects and advantages will be apparent from the description of the invention to those skilled in the gas separation arts.

DETAILED DESCRIPTION OF THE INVENTION

As used herein, gas means gas or vapor.

As used herein, $C_{3+}$ hydrocarbon means a straight-chain or branched chain saturated or unsaturated hydrocarbon having three or more carbon atoms.

The invention is a process train for treating a gas stream, typically but not necessarily natural gas, containing methane, nitrogen, and at least one of water, acid gas, $C_{3+}$ hydrocarbons and aromatic hydrocarbons. The process train includes a methane/nitrogen separation step, which is carried out at least in part by membrane separation, and an additional separation step that removes at least part of one of the other components.

The additional step may be carried out upstream or downstream of the methane/nitrogen membrane separation step, for example to any or all of the feed, residue and permeate streams. Any appropriate treatment techniques and equipment can be used for these additional separation step or steps, including, but not limited to, absorption units, including towers or columns containing liquid absorbents; adsorption units, including molecular sieves; condensation units, relying on chilling, compression or both to liquefy a portion of the gas stream; and membrane units, including those containing membranes selectively permeable to water vapor, $C_{3+}$ hydrocarbons, carbon dioxide or other constituents of the gas.

For example, if $C_{3+}$ hydrocarbons are present, it may be possible, and is desirable, to utilize the cooling provided to the methane/nitrogen separation membrane feed stream to recover a natural gas liquids (NGL) stream as an additional product. This can easily be done if the temperature required to achieve adequate methane/nitrogen selectivity and the desired hydrocarbon dewpoint of the raw feed gas are of the same order.

Many of the gas streams to which the invention is applicable are natural gas streams, and it is very frequently the case that these streams must be treated to remove both water and $C_{3+}$ hydrocarbons. In light of this need, the most preferred embodiment of the invention includes a dehydration step to bring the water vapor dewpoint to an acceptable level and an NGL removal step to bring the $C_{3+}$ hydrocarbon dewpoint to an acceptable level, followed by the methane/nitrogen separation step.

Figure 1:
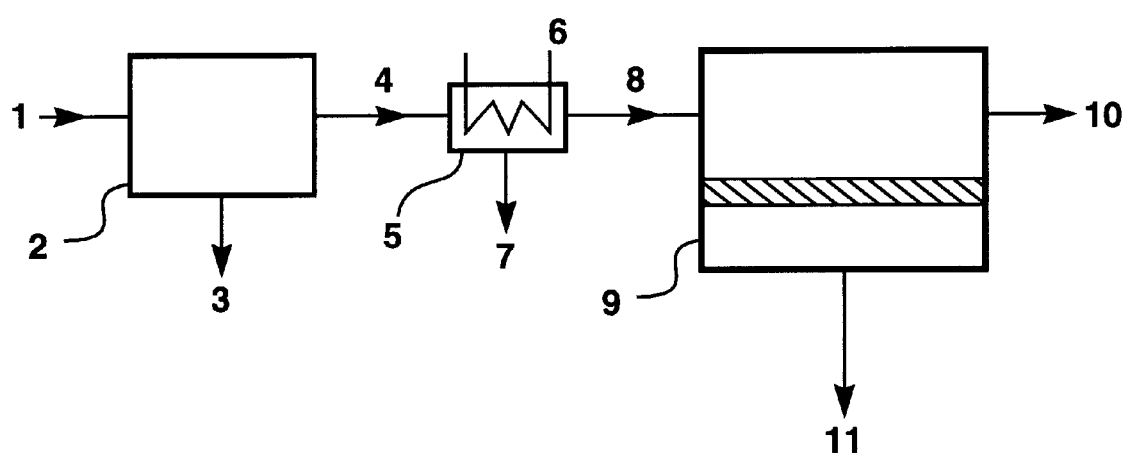
FIG. 1 is a schematic drawing illustrating a typical embodiment of the invention, incorporating a dehydration step, an NGL removal step and a membrane separation step for methane/nitrogen separation.

This embodiment is shown in FIG. 1, referring to which, feed stream 1, containing at least methane, nitrogen, water and $C_{3+}$ hydrocarbons, enters the process train. The stream passes first to dehydration unit 2, which may employ any known water removal techniques or combination of techniques, as discussed in more detail below. The removed water exits the process as stream 3. The dried gas stream 4 then enters NGL recovery system 5. The recovery system typically includes a heat exchanger or series of exchangers to cool the gas, as indicated by cooling line 6, followed by one or more phase separators to remove the liquefied hydrocarbons as stream 7. The remaining gas stream 8, which may, and generally does, still contain some water vapor and $C_{3+}$ hydrocarbons, as well as other contaminants, passes to membrane separation unit 9. Here the stream is divided into residue stream 10, depleted in methane, water and $C_{3+}$ hydrocarbons and enriched in nitrogen compared with stream 8, and permeate stream 11, enriched in methane, water and $C_{3+}$ hydrocarbons and depleted in nitrogen compared with stream 8. Streams 10 and 11 may pass to any destinations, such as pipeline, flare, fuel lines, further treatment, discharge, etc.

At least the NGL removal step and the methane/nitrogen separation step will usually, although not necessarily, operate at sub-ambient temperature, such as 0° C. or below. Occasionally, the gas stream to be treated in the process train may already be at a temperature appropriate to these operations, but in most cases the stream will need to be chilled. Cooling can be obtained by any convenient method known to the art. Typically, but not necessarily, cooling will involve heat exchange by running the feed gas stream in indirect contact against a colder fluid.

It is preferred if heat integration can be practiced, such as by using at least a portion of the residue or permeate streams from the membrane separation step, or both, to cool or partially cool the incoming feed. The nitrogen-enriched residue stream is often at a high pressure compared with atmospheric, such as 500 psig or 1,000 psig. In this case, it may be acceptable, and is attractive from the energy efficiency and cost points of view, to exploit the available high pressure by expanding this stream to a lower pressure, such as in a turbo-expander, before using it as a heat-exchange medium for the feed stream. This provides additional cooling, and the turbo-expander may optionally also be used to at least partially recompress the permeate gas.

Cooling of the gas stream entering the unit operations can be done in one or multiple stages, at the front of the process train, and/or as the first part of the NGL removal step after the gas has been dehydrated, and/or between the NGL removal step and the methane/nitrogen separation step after some of the heavier components have been removed. It is preferred to integrate the NGL removal step and the methane/nitrogen separation step, so that cooling is provided as the first part of the NGL removal step, and this cooling also lowers the temperature of the gas stream exiting the NGL removal step sufficiently for adequate separation in the methane/nitrogen membrane separation step.

FIG. 1 shows gas flowing directly out of the dehydration step into the NGL removal step, and directly out of the NGL removal step into the methane/nitrogen separation step. Those of skill in the art will appreciate that processes in which other operations are performed between these steps are within the scope of the invention. For example, a carbon dioxide removal step could be positioned between the dehydration step and the NGL removal step, or other coalescing, filtering, heating, cooling or separating steps could be included as desired.

Having thus outlined the process of the invention and the most preferred embodiment thereof, the individual process steps are now discussed in more detail.

Methane/nitrogen separation step

The membrane separation of nitrogen from methane, shown in block form as unit 9 in FIG. 1, is carried out using a methane-selective membrane, as generally in accordance with the teachings of U.S. Pat. Nos. 5,669,958 and 5,647,227.

That is, a feed stream containing methane, nitrogen and at least one of water, acid gas, $C_{3+}$ hydrocarbons and aromatic hydrocarbons is passed across the feed side of the membrane. A driving force for transmembrane permeation is provided by a superatmospheric pressure on the feed side, a subatmospheric pressure on the permeate side, or both. A residue stream depleted in methane and enriched in nitrogen compared with the feed is withdrawn from the feed side of the membrane. A permeate stream enriched in methane and depleted in nitrogen is withdrawn from the permeate side.

The amount of nitrogen that is acceptable in the methane product stream depends on the destination of the methane. Natural gas pipeline specification is typically no more than 4% total inerts, so depending on the other constituents, this means no more than about 4% nitrogen, but perhaps no more than 2% or 3% nitrogen, for example, if carbon dioxide, helium, argon or other constituents are also present. If purer methane is required, the target nitrogen content may obviously be lower. If the gas stream can be diluted with a supply of clean gas, higher nitrogen levels may be acceptable, for example up to about 8% nitrogen.

The amount of methane remaining in the nitrogen residue stream should preferably be low, since this is frequently essentially a waste stream. Thus, it is preferred if this stream contain no more than about 50% of the methane content of the feed stream to the total process, more preferably no more than about 25% of the methane content, and most preferably no more than about 10%.

One particular advantage is the ability of the membranes to operate in the presence of water and hydrocarbons. Water is always present in raw natural gas streams to some extent, as vapor, entrained liquid, or both. The presence of this water has little or no adverse effects on the types of membranes used in the invention, but will simply permeate the membrane along with the methane. Likewise, propane, butane and higher hydrocarbons will pass into the permeate stream. Even if the membrane separation is performed at close to the dew point for these components, any condensation of liquid will not damage the membrane. In fact, as discussed in more detail in co-owned U.S. Pat. No. 5,688,307, entitled "Separation of Low-Boiling-Point Gases using Super-Glassy Membranes", incorporated herein by reference in its entirety, when super-glassy membranes are used, the presence of material in the feed stream that can condense within the membrane enhances the methane/nitrogen separation capability. This removal of water and hydrocarbons into the permeate stream is beneficial, especially when the residue stream is destined for cryogenic treatment, as discussed more fully below.

Most membranes that have been used in the past in the gas industry, such as cellulose acetate membranes for removing carbon dioxide from methane, are not suitable for the methane/nitrogen step of the invention. Neither are any other conventional glassy polymer membranes, which exhibit slight selectivity in favor of nitrogen over methane.

Without wishing to be bound by theory, we believe the methane/nitrogen separation step can best be understood starting from a brief theoretical explanation of permeation in polymer materials. A synthetic polymer membrane separates the components of a gas or vapor mixture because the components permeate the membrane at different rates. The permeability, P [cm$^3$(STP)·cm/cm$^3$·s·cmHg], of a polymer membrane material for a gas is defined as the rate at which that gas moves through a standard thickness [1 cm] of the material under a standard driving force [a pressure difference of 1 cmHg]. A measure of the ability of a membrane to separate two gases is the selectivity, α, defined as the ratio of the gas permeabilities, P$_1$/P$_2$. Selectivity can also be expressed as:

$$\alpha = \frac{D_1}{D_2} \cdot \frac{k_1}{k_2}$$

where D is the diffusion coefficient of the gas in the membrane [cm$^2$/s], which is a measure of the gas mobility, and k is the Henry's law sorption coefficient, which links the concentration of the gas in the membrane material to the pressure in the adjacent gas [cm$^3$(STP)/cm$^3$·cmHg]. The intrinsic selectivity of a polymer material is established by measuring the permeabilities with pure gas or vapor samples, then calculating the ratio. The actual selectivity obtained in a real separation process is established by making permeation measurements with gas mixtures.

The ratio D$_1$/D$_2$ is the ratio of the diffusion coefficients of the two gases and can be viewed as the mobility selectivity, reflecting the different sizes of the two molecules. The ratio k$_1$/k$_2$ is the ratio of the Henry's law solubility coefficients of the two gases and can be viewed as the solubility selectivity, reflecting the relative condensabilities of the two gases.

In all polymer materials, the diffusion coefficient decreases with increasing molecular size. Hence, the mobility component of the selectivity always favors the passage of small molecules over large ones. The solubility component of the selectivity, on the other hand, is a measure of the energy required for sorption and normally increases with molecular diameter, because larger molecules are normally more condensable than smaller ones. The combined effect of these two factors determines the selectivity of the membrane.

The balance between mobility selectivity and solubility selectivity is different for glassy and rubbery polymers. In glassy polymers, the diffusion term is usually dominant, permeability falls with increasing permeant size and the material is selective for small molecules over large ones. In rubbery polymers, the solubility term is usually dominant, permeability increases with increasing permeant size and the material is selective for large molecules over smaller ones. The molecular kinetic diameters of nitrogen (3.64 Å) and methane (3.8 Å) are similar, and methane has a critical temperature of −82.6° C., so is only moderately more soluble than nitrogen in most polymer materials. The slightly smaller molecular size of nitrogen means that glassy materials slightly favor the passage of nitrogen over methane. The relative condensability of methane means that rubbery materials slightly favor the passage of methane over nitrogen. As a result of the similar molecular sizes and the poor condensability of both components, however, both glassy and rubbery membrane materials have poor selectivity for this gas pair, as was illustrated in Table 1.

However, we have found that, with cooling, an acceptable methane/nitrogen selectivity, for example, about 4, 5 or more is obtainable with gas mixtures in certain rubbery polymer membranes. In addition, we have found that such selectivities can be accompanied by usefully high transmembrane methane fluxes, such as at a very minimum at least about 1×10$^{-6}$ cm$^3$(STP)/cm$^2$·s·cmHg, preferably at least 1×10$^{-5}$ cm$^3$(STP)/cm$^2$·s·cmHg and more preferably at least 1×10$^{-4}$ cm$^3$(STP)/cm$^2$·s·cmHg.

As can be seen from the brief explanation of the solution/diffusion transport mechanism above, it is important that the material to be used remains rubbery under the temperature conditions at which it is used, so that the separation remains dominated by the sorption or solubility term. As the temperature is reduced from 20° C., rubbery membranes at first become more methane selective with falling temperature. The transmembrane fluxes of both gases fall, but the loss in methane flux is small compared with the loss in nitrogen flux, so that the selectivity increases. As the temperature is decreased further, the membrane material begins to lose flexibility and the balance of the sorption and diffusion components of the selectivity shifts in favor of the diffusion term, so that the material now becomes less methane-selective, rather than more, as the temperature falls. In some materials the properties may alter to such an extent that the material becomes nitrogen-selective, even considerably above the nominal glass-transition temperature. Thus, the operating temperature of the invention should preferably be at least 30° C. above the glass-transition temperature of the rubbery membrane material, more preferably at least 40° C. above and most preferably at least 50° C. or more above. Also, the lower the temperature that is used, the greater is the cost and difficulty of reaching that temperature.

On the other hand, since it is the difference between the sorption of methane and nitrogen that provides the selectivity, it is desirable to take advantage of a low operating temperature to enhance this difference.

Considering the need to balance these factors, our preferred appropriate operating temperature for the methane/nitrogen separation membranes is below 0° C., or, expressed as a temperature range, between 0° C. and −100° C., more preferably between about −10° C. and −80° C. and most preferably between about −20° C. and −70° C. Specifically we prefer to operate, where possible, at temperatures no lower than about −40° C., −50° C., −60° C. or −70° C. The choice of operating temperature is influenced to some extent, of course, by the particular transport properties of the membrane material used.

The preferred rubbers for making membranes for use in the invention are those that have a glass transition temperature (T$_g$) at 1 atmosphere pressure of below −50° C., more preferably below −80° C. and most preferably below −100° C.

Specific, but non-limiting, preferred rubbery materials that we have found to be within the scope of this definition include siloxane polymers, particularly the polymers having a repeating unit having the structure:

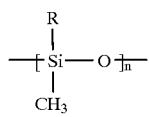

wherein R is an alkyl group having one to eight carbon atoms and n is a positive integer. These have glass transition temperatures approximately as follows:

| | |
|---|---|
| Poly(dimethylsiloxane) | −123° C. |
| Poly(methylethylsiloxane) | −135° C. |
| Poly(methylpropylsiloxane) | −120° C. |
| Poly(methylhexylsiloxane) | −108° C. |
| Poly(methyloctylsiloxane) | −92° C. |

Amongst these, particularly preferred are poly(dimethylsiloxane), that is, silicone rubber, and poly(methyloctylsiloxane). Poly(methylphenylsiloxane) may also be used. Other rubbers that we expect to be useful include those listed in Table 1, specifically poly(dimethylsiloxane-dimethylstyrene) poly(siloctylene-siloxane) and poly(p-silphenylene-siloxane). Yet other rubbers include polymethylene, poly(dimethylsilylenemethylene), cis-poly(1-butylene), poly(dimethoxyphosphazene), poly(octadecylmethacrylate) and poly(oxytetramethylenedithiotetramethylene), all of which have glass transition temperatures in the range −70° C. to −110° C. Yet other rubbers that may be useful include methylene-ethylene copolymers having glass transition temperatures around −100° C., polyisoprene, polybutadiene and natural rubber.

Usually, rubbery materials do not have enough mechanical strength to be formed as unsupported membranes. Therefore, preferred embodiments incorporating rubbery selective materials involve the use of a composite membrane comprising a microporous support, onto which the rubbery selective layer is deposited as a thin coating. The preparation of such membranes is well known in the membrane-making art. It is commonly thought that rubbery composite membranes do not withstand high-pressure operation well, and to date, such membranes have not been generally used in natural gas treatment, where feed gas pressures are often as high as 500 psig or 1,000 psig. We have found, however, that composite membranes, with thin enough rubbery selective layers to provide adequate transmembrane methane flux, can be used satisfactorily at high feed pressures and not only maintain their integrity but continue to exhibit adequate selectivity for methane over nitrogen.

A second type of membrane that we have found to be useful for the methane/nitrogen separation step is formed from the so-called "super-glassy" polymers. These materials are characterized by having a rigid structure, high glass transition temperatures, typically above 100° C., 200° C. or higher, and unusually high free volume within the polymer material, such as more than 10%, more than 20% or even as high as 25% or more (as estimated from vapor solubility data according to the method of W. J. Koros et al., J. Membrane Science, Vol. 2, page 165, 1977). In contrast, conventional glassy polymers typically have free volumes within the polymer itself of a few percent, such as 3% for polycarbonate, or 6% for polyphenylene oxide. Super-glassy materials useful for carrying out the invention exhibit unusual behavior for glassy materials in that they preferentially permeate larger, more condensable molecules over smaller, less condensable molecules, so that they are selective, albeit slightly at room temperature, for methane over nitrogen. Super-glassy materials useful for carrying out the invention are further characterized in that they have a high methane permeability at room temperature, by which we mean a permeability of at least about 1,000 Barrer.

Without wishing to be bound by theory, we believe that certain of the high-free-volume, glassy polymers are useful in our invention because their permeation properties are not governed by solution/diffusion (the mechanism of gas transport in conventional, low-free-volume polymers), but are more akin to transport in microporous polymers.

If numerical values for free volume, glass transition temperature and/or methane permeability are not to hand, therefore, a simple, first-pass screening technique to identify likely high-free-volume glassy polymers for carrying out our invention is to examine the oxygen/nitrogen permeability data. Such data are much more readily available for many materials than methane permeability data, and will enable potential candidate materials to be rapidly identified. We believe materials with the required structure to meet the demands of our invention will normally have oxygen permeabilities at room temperature of at least about 500 Barrer (where 1 Barrer=$1\times10^{-10}$ cm$^3$(STP)·cm/cm$^2$·s·cmHg), and oxygen/nitrogen selectivity at room temperature of no more than about 2.5.

The best known of the super-glassy materials, representative of the class and useful in our invention, is polytrimethylsilylpropyne (PTMSP), which has a free volume of about 25% according to the above-mentioned method. Although PTMSP is rigid and glassy, up to at least about 200° C., it exhibits an oxygen permeability of 10,000 Barrer or above, more than 15 times higher than that of silicone rubber, previously the most permeable polymer known. The selectivity for oxygen/nitrogen, however, is low (1.5–1.8). The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide. These pure-gas data suggest that PTMSP will exhibit poor selectivity for most gas separations. See for example, a paper by N. A. Platé et al. entitled "Gas and vapor permeation and sorption in poly(trimethylsilylpropyne)", Journal of Membrane Science, Vol. 60, pages 13–24, 1991.

We also found that permeation tests performed with pure gas samples of methane and nitrogen yielded low calculated ideal selectivities. We found, however, that the measured mixed-gas selectivity is slightly better, at about 2.5–3. Furthermore, we found that chilling the feed gas stream produced a substantial increase in selectivity, while maintaining good permeability. For example, chilling to −30° C. raised the mixed gas methane/nitrogen selectivity to about 5.5. This selectivity was obtained with a simulated natural gas stream containing 82% methane, 9% ethane, 3% propane, 1% butane and 5% nitrogen.

Non-limiting examples of the types of polymer materials useful for carrying out the processes of the invention include members of the following structure groups that also meet the above glass-transition temperature, free volume and permeation limits:

(i) Substituted acetylenes, having the general structural formula

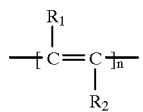

where $R_1$ and $R_2$ are independently hydrogen, a halogen, $C_6H_5$ or a linear or branched $C_1$–$C_4$ alkyl group and n is a positive integer.

(ii) Silicon-containing polyacetylenes, having the general structural formula

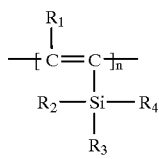

where $R_1$ is a linear or branched $C_1$–$C_4$ alkyl group, $R_2$ and $R_3$ are independently linear or branched $C_1$–$C_6$ alkyl groups, and $R_4$ is a linear or branched $c_1$–$C_{12}$ alkyl or aryl group and n is a positive integer.

(iii) Germanium-containing polyacetylenes, having the general structural formula

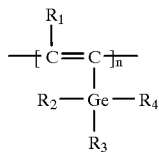

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group and n is a positive integer.

(iv) Copolymers of any of the above with each other or with other polymer materials.

A particularly useful polymer material falling within the general definitions above is poly(trimethylsilylpropyne) (PTMSP), which has the structure:

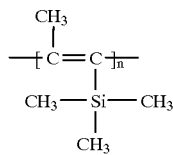

where n is a positive integer.

Membranes useful in the methane/nitrogen separation step may be formed from these glassy, high-free-volume materials in a variety of ways. Because the materials are glassy and rigid, an unsupported film of the polymer may be usable as a single-layer gas separation membrane. Alternatively, the membrane may be an integral asymmetric membrane, comprising a dense region that forms the separation membrane and a microporous support region. As a further alternative, the membrane may be a composite membrane comprising the separation membrane and an attached or unattached backing layer, or a composite membrane comprising a microporous support membrane of one polymer coated with the separation membrane of another polymer. We prefer to use composite membranes.

A third type of membrane that may be used is finely microporous inorganic membranes, such as adsorbent carbon membranes of the type described in U.S. Pat. No. 5,332,424, pyrolysed carbon membranes of the type described in U.S. Pat. No. 4,685,940, or certain ceramic membranes. These types of membranes can exhibit acceptable methane/nitrogen selectivity in the presence of a $C_{3+}$ hydrocarbon or other relatively condensable component in the gas mix.

Whether rubbery polymers or other membrane materials are used, membranes useful in the invention may be formed as flat sheets, hollow fibers or any other convenient form, and housed in any appropriate type of module, such as plate-and-frame, potted fiber or spiral-wound. Spiral-wound modules are a preferred choice.

Figure 2:
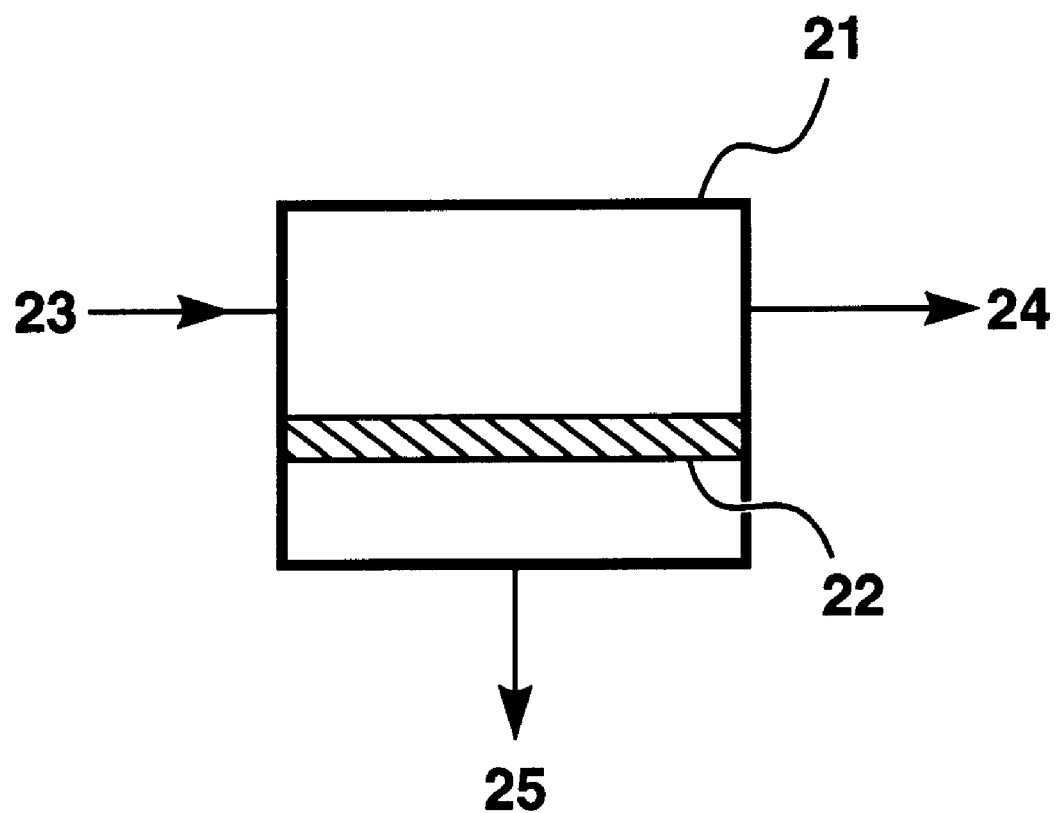
FIG. 2 is a schematic drawing illustrating the methane/nitrogen separation step in its simplest form.

The basic methane/nitrogen separation step is represented in simple form in the schematic drawing of FIG. 2. Referring now to this figure, membrane unit 21 contains a membrane 22 that exhibits selectivity for methane over nitrogen. Feed stream 23, containing methane, nitrogen and another component, passes across the feed side of the membrane. Residue stream 24, enriched in nitrogen and depleted in methane compared with stream 23, is withdrawn from the feed side. Permeate stream 25, enriched in methane and depleted in nitrogen compared with stream 23, is withdrawn from the permeate side. Transmembrane permeation occurs because permeate stream 25 is at a lower pressure than feed stream 23. The pressure difference between the feed and permeate sides of the membrane may occur because the raw feed gas is already at elevated pressure, such as 300 psia, 500 psia or 1,000 psia. Alternatively, the pressure difference can be created by compressing the feed stream before it enters the membrane unit, by drawing a partial vacuum on the permeate side, or by combinations of these, such as is widely understood and practiced in the gas separation art.

FIG. 2 shows a basic arrangement in which a single bank of membrane modules is used. It will be appreciated by those of skill in the art that many arrangements of membrane modules are possible within the scope of the invention. For example, two-stage or multi-stage configurations, in which the permeate from one module or bank of modules is fed to the next stage, can be used if further processing of the first-stage permeate is required. Two-step or multi-step configurations, in which the residue from one module or bank of modules is fed to the next step, can be used if further processing of the first-step residue is required. Multi-stage and multi-step arrangements can also be combined.

Figure 3:
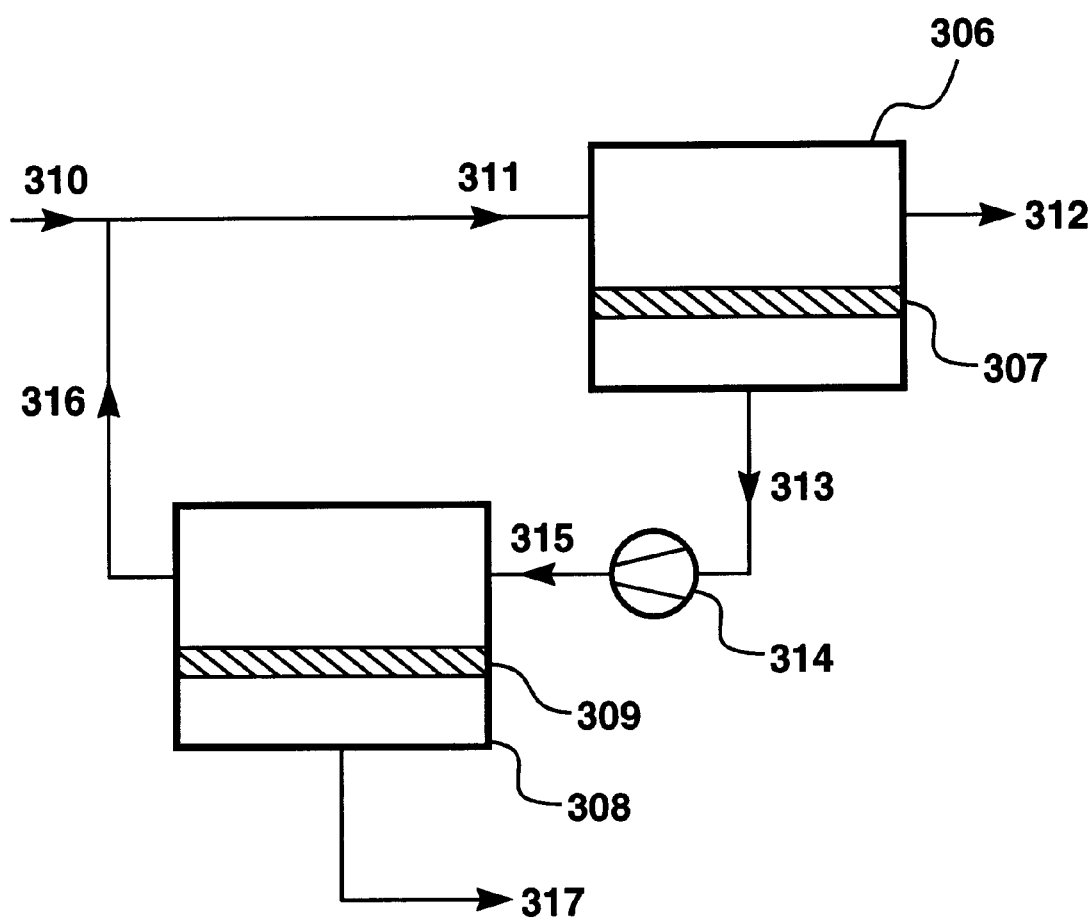
FIG. 3 is a schematic drawing illustrating the methane/nitrogen separation step as carried out using a two-stage membrane unit.

As just one example, for feed streams with a high nitrogen content, a two-stage membrane system as shown in FIG. 3 is preferred over a one-stage membrane system to meet natural gas pipeline specification without excessive loss of methane. Referring now to FIG. 3, membrane units 306 and 308 contain membranes 307 and 309 that exhibit methane/nitrogen selectivity. Gas stream 310, containing at least methane and nitrogen, is mixed with recycle stream 316 to form feed stream 311, which passes across the feed side of membrane 307. Residue stream 312, enriched in nitrogen and depleted in methane compared with stream 311, is withdrawn from the feed side. First permeate stream 313, enriched in methane and depleted in nitrogen compared with stream 311, is withdrawn from the permeate side of membrane 307. Transmembrane permeation occurs because permeate stream 313 is at a lower pressure than feed stream 311. Stream 313 is compressed in compressor 314 to form feed stream 315 to the second membrane unit 308. Stream 315 passes across the feed side of membrane 309. Residue stream 316, enriched in nitrogen and depleted in methane compared with stream 315, is withdrawn from the feed side of membrane 309 and is recycled to join stream 310. Second permeate stream 317, further enriched in methane and depleted in nitrogen compared with stream 315, is withdrawn as the methane product stream from the permeate side of membrane 309.

The gas stream may contain methane and nitrogen in any proportions. The process can handle streams containing relatively small amounts of nitrogen, such as no more than about 10% nitrogen, or larger amounts, such as more than 10% nitrogen, more than 20% nitrogen or more than 30% nitrogen or higher. However, if the gas stream to be treated has both a flow rate of more than 20 MMscfd and a high nitrogen content, such as more than 10%, membrane treatment alone may have difficulty providing adequate methane recovery. In such cases it is preferred, and in other cases it may sometimes be desired, to carry out the methane/nitrogen separation by a combination of membrane separation with cryogenic methane/nitrogen separation, as discussed at length in U.S. Pat. No. 5,647,227.

Figure 4:
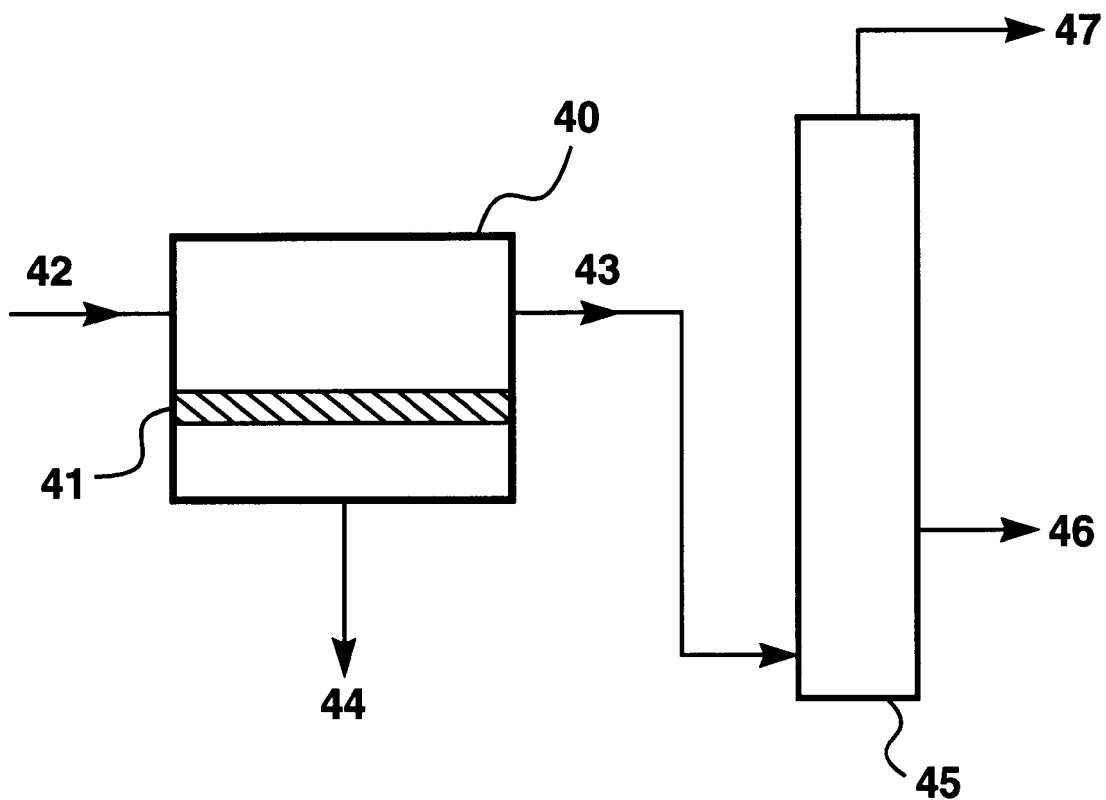
FIG. 4 is a schematic drawing illustrating the methane/nitrogen separation step as carried out by a combination of membrane separation and cryogenic separation.

FIG. 4 shows such a treatment combination schematically. Referring now to FIG. 4, membrane unit 40 contains a membrane 41 that exhibits methane/nitrogen selectivity. Gas stream 42, containing at least methane and nitrogen, passes across the feed side of membrane 41. Residue stream 43, enriched in nitrogen and depleted in methane compared with stream 42, is withdrawn from the feed side. Permeate stream 44, enriched in methane and depleted in nitrogen compared with stream 42, is withdrawn from the permeate side of membrane 41. Residue stream 43 passes to cryogenic unit 45 for further separation of nitrogen from methane. Stream 46 is the methane product stream. Stream 47 is the nitrogen reject stream.

The membrane separation/cryogenic distillation approach invention has significant advantages over cryogenic distillation alone. A moderately sized membrane system can reduce the volume flow of gas to the cryogenic unit substantially, thereby reducing the required capacity of the unit. This reduction in load is advantageous, because it saves on both capital and operating costs of the cryogenic step. If the load supplied to the cryogenic unit is reduced to, say, one third of its value absent the membrane unit, then the same cryogenic plant can now process three times the quantity of raw gas than was previously possible. Because many uses of the permeate gas require it to be repressurized, the cost of repressurizing the gas has to be taken into account in the cost and energy balance of the system. However, the cost of operating the membrane unit plus the permeate recompression cost is normally substantially less, per unit of gas treated, than the conventional pretreatment costs for the cryogenic plant plus the cost of operating the plant itself.

Another advantage is that the membrane separation step can reduce the complex and costly pretreatment train that is normally required upstream of a cryogenic distillation unit. As was mentioned above, an advantage of our membranes is their ability to operate in the presence of water and hydrocarbons, even at high concentrations.

This capability is in sharp contrast to cryogenic methane/nitrogen separation. In cryogenic processes, water, carbon dioxide and hydrocarbons must be removed to a very low level, often much lower than gas pipeline specifications would otherwise demand, before cryogenic treatment is undertaken to avoid such contaminants freezing and plugging the cryogenic section of the plant. For gas to be suitable for cryogenic processing, the carbon dioxide content should typically be no more than about 100 ppm, the water vapor content no more than about 1–2 ppm, and the hydrocarbon dewpoint below at least −100° C. In contrast, natural gas pipeline specification for carbon dioxide is usually in the range 1–3%, for water vapor up to about 140 ppm, and for $C_{3+}$ hydrocarbons a dewpoint of −20° C. This disparity creates a disincentive to use cryogenic techniques for methane/nitrogen separation in natural gas processing. The "overprocessing" needed to meet the cryogenic requirements can be costly, inconvenient and can lead to the creation of secondary streams and wastes for which there is no ready use or disposal method.

With the process of the invention, it is still required to treat the gas stream to the extent necessary to meet pipeline specification, if that is the destination of the gas. However, up to 2% is typically an acceptable carbon dioxide content for pipeline specification. This is very different from the ppm levels that may be needed before the gas can be cryogenically treated. Also, there is much greater flexibility in performing other treatments steps upstream or downstream in any convenient combinations.

Suppose, for example, that, besides methane, the gas stream approaching the cryogenic unit contains 10% nitrogen, 1% carbon dioxide, 100 ppm water vapor and has a $C_{3+}$ hydrocarbon dewpoint of −50° C. Thus, apart from an excess of nitrogen (>4%), the raw gas meets pipeline specification. The membrane step enables the pipeline-acceptable levels of carbon dioxide, water vapor and hydrocarbons, plus a portion of methane and nitrogen, to bypass the cryogenic unit. The membrane permeate stream, containing these components, can be remixed with the essentially pure methane bottom stream from the cryogenic unit to yield a pipeline quality methane product stream. Since the membrane permeate is to be remixed with a volume of pure methane, the nitrogen content in the permeate stream can be higher than pipeline target, so long as the remixed methane product gas does not exceed the total inerts, carbon dioxide or nitrogen requirements of the pipeline. Even if the starting composition of the gas and the operating constraints are such as to yield a remixed strewn that exceeds specification, the option exists to carry out the process as described above, then dilute the methane product stream further with clean gas or subject it to some supplementary treatment.

For example, referring to the basic design of FIG. 4, the methane product stream would be produced by remixing the two methane-laden streams, permeate stream 44 and methane-rich stream 46, downstream of unit 45. In processes of this type, no methane is lost during the process and the only stream produced besides the pipeline gas is the clean nitrogen stream from the top of the cryogenic distillation column.

The methane/nitrogen membrane separation may also be augmented by any other separation techniques, such as absorption or adsorption, as discussed in U.S. Pat. No. 5,669,958. In particular, combinations of membrane separation with pressure swing adsorption are advantageous for some strewn sizes and compositions.

Additional separation step) or steps

The additional separation steps remove other contaminants, notably water, $C_{3+}$, hydrocarbons, acid gases or aromatic hydrocarbons from the gas stream.

As was mentioned above, the scope of the invention includes any treatment steps carried out upstream or downstream of the methane/nitrogen separation step to remove such components. Because the methane/nitrogen separation step is generally operated at low temperatures, such as 0° C.

or below, it is frequently advantageous to remove the other contaminants upstream of the membrane separation step, at least to the point where ice or hydrate formation in the membrane system lines is avoided.

However, as has also been pointed out above, the membranes themselves can handle water and hydrocarbons without difficulty, and these components can be concentrated in the methane-rich permeate stream. Thus, the opportunity for further separation of the permeate stream into additional product fractions exists, and it is believed that process trains involving removal of additional components from the permeate stream will also be widely useful.

It will be apparent to those of skill in the art that numerous embodiments of the invention carrying out these additional separation steps in diverse ways are possible. For example, these include, but are not limited to:

- a dehydration step followed by the methane/nitrogen membrane separation step
- an NGL removal step followed by the methane/nitrogen membrane separation step
- a dehydration step and an NGL removal step followed by the methane/nitrogen membrane separation step
- an acid gas removal step followed by the methane/nitrogen membrane separation step
- an acid gas removal step followed by a dehydration step followed by the methane/nitrogen membrane separation step
- a methane/nitrogen membrane separation step followed by an NGL removal step on the permeate stream
- a methane/nitrogen membrane separation step followed by a dehydration step on the permeate stream
- a dehydration step and an NGL removal step followed by the methane/nitrogen membrane separation step, followed by a second NGL removal step on the permeate stream.

In the interest of simplicity, brevity and clarity, the most commonly practiced steps are described in detail as they take place in the most preferred embodiment, that is, a dehydration step followed by an NGL recovery step carried out on the feed stream to the methane/nitrogen separation step.

Dehydration step

The dehydration step, shown in block form as unit or step 2 in FIG. 1, may be carried out by any known technique. A preferred method, widely used in the gas industry, is absorption into a solution of triethylene glycol, diethylene glycol, ethylene glycol, or the like. In a glycol dehydration unit, wet gas is scrubbed with glycol solution. Spent, water-laden glycol is passed to a regeneration system where it is heated and absorbed water is driven off. The regenerated glycol is recirculated to the dehydrator. The glycol solutions used in dehydrators also have a strong absorption affinity for aromatic compounds, such as benzene, toluene, xylene, and ethylbenzene, and will remove these compounds with the water. Glycol dehydrators can generally lower the water vapor dewpoint of the gas to about −40° to −50° C.

If a lower dewpoint is required, a molecular sieve dehydrator, which can achieve water vapor dewpoints of as low as about −100° C., can be used. The sieves usually take the form of beds of specialized aluminosilicates, which are regenerated by heating to high temperatures. To control costs, it is preferred to use a molecular sieve downstream of a glycol dehydrator, rather than alone, if such a low dewpoint is needed. Other solid desiccants, such as silica gel or alumina can also be used, in conjunction with glycol dehydration or alone, to provide a gas stream with a water dewpoint down to about −60° C. or −70° C.

As a further alternative, the dehydration step can be carried out in whole or in part by membrane separation. Water vapor permeates rapidly through both glassy and rubbery membrane materials, and many dehydration membranes and processes are known and described in the literature. See, for example, U.S. Pat. Nos. 4,718,921; 5,002,590; 5,067,971; 5,240,472 and 5,401,300. As with glycol dehydrators, membranes are more suited to performing a bulk than a very high-purity separation, and have difficulty reaching very low dewpoints; thus a polishing step by molecular sieve or desiccant can be used after the membrane separation step if desired.

The target for the dehydration step depends on the pressures and temperatures that the gas stream will encounter downstream, and is, therefore, preferably expressed in terms of the water vapor dewpoint under the prevailing pressure condition. For good separation in the methane/nitrogen membrane separation step, it is required, as discussed above, to operate the membrane unit at low temperature, such as below 0° C., and frequently substantially colder, such as −20° C., −40° C. or occasionally even lower. The pressure at which the system is run is typically from a few hundred to a few thousand psia. Thus, as a guideline, it is preferred that the water dewpoint of the gas be no higher than about 0° C. at 1,000 psia, and more preferably lower, such as no more than −20° C. at 1,000 psia, or no more than −40° C. at 1,000 psia as necessary. In ppm terms, this will generally translate to a content below 100 ppm, and often as low as 50 ppm, 10 ppm or lower.

In terms of FIG. 1, the dehydration step results in a dried gas stream 4 and a waste stream 3. It will be apparent that, depending on how the dehydration step is performed, stream 3 may be a single stream, such as the vent stream from regeneration of the glycol sorbent or the molecular sieve, or the membrane permeate stream, or may represent several streams from the unit operations.

NGL removal/recovery step

The NGL removal step is shown in block form as unit or step 5 in FIG. 1. The dried or partially dried gas, stream 4, from the dehydration step forms the feed to this step. In terms of FIG. 1, the NGL removal step results in a $C_{3+}$ hydrocarbons-depleted stream 8 and a raw NGL stream 7.

In some situations, the target for the NGL removal step is similar to that of the dehydration step, namely to lower the hydrocarbon dewpoint to a level that will avoid hydrocarbon condensation in downstream equipment or pipelines. It is preferred, therefore, that the $C_{3+}$ hydrocarbon dewpoint of the gas be no higher than about 0° C. at 1,000 psia, and more preferably lower, such as no more than −20° C. at 1,000 psia, or no more than −40° C. at 1,000 psia as necessary. In concentration terms, this will generally translate to a total $C_{3+}$ hydrocarbons content below 5%, and often as low as 4%, 3%, 2% or lower. NGL may also be removed for Btu control or simply to recover a valuable secondary product.

Figure 5:
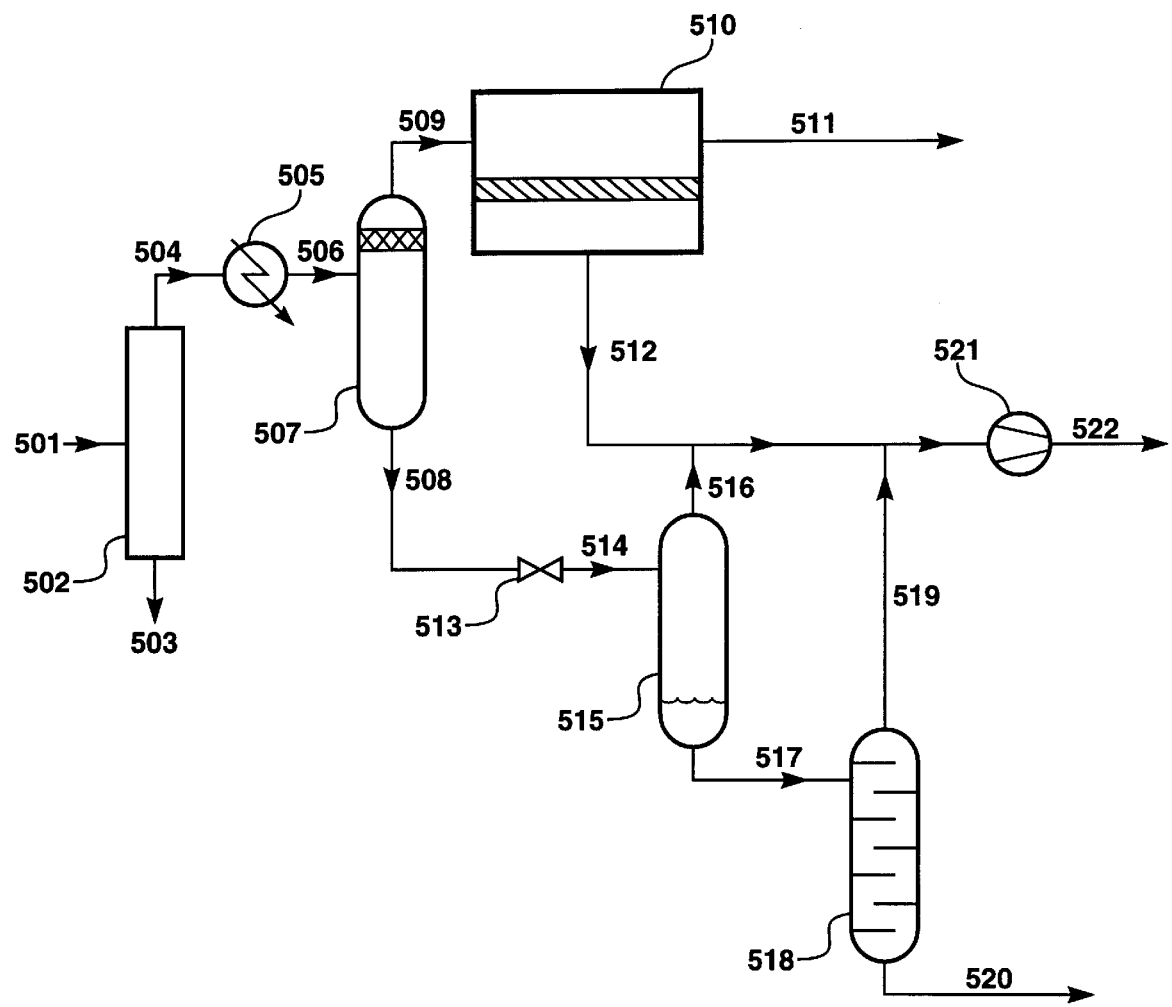
FIG. 5 is a schematic drawing illustrating a preferred process train.

The preferred technique for NGL recovery involves removing $C_{3+}$ hydrocarbons by cooling to condense them, then separating and treating the raw condensate as necessary. The cooling is provided as indicated conceptually by line 6 in FIG. 1. A representative, simple outline of the operations that are usually involved in the cooling/condensation/recovery operation is shown in FIG. 5. Referring to that figure, which is explained fully in Example 7 below, stream 504 corresponds to stream 4 from the dehydrator in FIG. 1. This dried gas stream is passed to cooling section 505. The cooling provided here will optionally, but preferably, serve both to condense $C_{3+}$ hydrocarbons and to lower the non-condensed stream temperature sufficiently for the following methane/nitrogen membrane separation step.

Cooling may be achieved by heat-exchange with product streams, and/or by an external refrigerant, such as propane or propylene. As stated in the parent applications with regard to the membrane separation step, it is preferred if heat integration can be practiced, such as by using at least a portion of the residue or permeate streams, or both, from the membrane unit to cool or partially cool stream 504. The nitrogen-enriched residue stream 511 is often at a high pressure compared with atmospheric, such as 500 psig or 1,000 psig. In this case, it may be acceptable, and is attractive from the energy efficiency and cost points of view, to exploit the available high pressure by expanding this stream to a lower pressure, such as in a turbo-expander, before using it as a heat-exchange medium for the feed stream. This provides additional cooling, and the turbo-expander may optionally also be used to at least partially recompress the permeate gas.

Likewise, if the methane/nitrogen separation step includes a cryogenic distillation step, the nitrogen-rich stream from the distillation unit, stream 47 in FIG. 4, is both cold and at high pressure. This stream can be expanded to lower pressure, thereby reducing its temperature even further, and used to provide upstream cooling. The bottom methane-rich stream, 46, may also be available for cooling other streams, particularly if it does not need to be maintained at high pressure.

Thus, the cooling step typically involves a combination of heat exchange against one or more process streams plus some supplementary external refrigeration.

The cooled stream 506 is then separated into gaseous fraction 509 and liquid fraction 508 in separator 507. FIG. 5 shows one cooling and one separation step; it will be apparent that multiple cooling/separation steps can also be used.

The raw condensate 508 is stabilized by pressure reduction/flashing, as indicated schematically by valve 513 and flash tank 515. Again, it will be appreciated by those of skill in the art that, particularly if a substantial pressure change is involved, such stabilization is frequently carried out in multiple stages at progressively lower pressure. The stabilization step produces a light overhead stream 516 and a stabilized liquid stream 517. Stream 517 then passes to demethanizer 518 for removal of the lightest components as overhead stream 519. The NGL product is recovered as stream 520. The $C_{3+}$ hydrocarbons-depleted stream, 8 in FIG. I and 509 in FIG. 5, now both drier and lighter than original feed stream 1 or 501, passes on to the methane/nitrogen separation step.

As an alternative to NGL removal by condensation alone, combinations of membrane separation and condensation may be used to recover the heavier hydrocarbons as a liquid product. Detailed descriptions of such processes are to be found in U.S. Pat. Nos. 5,089,033; 5,199,962; 5,205,843; and 5,374,300, for example.

Acid gas removal

Optionally, an acid gas removal step, such as a carbon dioxide removal step or a hydrogen sulfide removal step, of any type may be included at any convenient point in the process train to handle raw gas that is out of specification in this regard. For example, such a step could be carried out before the dehydration step.

Various techniques for acid gas removal are well known in the industry. One such technique is amine absorption. Amines commonly used include MEA, DEA, DIPA, DGA and MDEA. The amine unit can be configured to remove both carbon dioxide and hydrogen sulfide, if necessary. When the amine solution is spent, the acid gases are flashed off and the solution is regenerated.

Another technique, used particularly for smaller gas streams, is membrane separation, using cellulose acetate or other membranes. Representative processes are described in U.S. Pat. Nos. 4,130,403, 4,466,946 and 5,407,467, for example.

A third technique is cryogenic separation, which can be carried out as the sole acid gas removal technique or in combination with other techniques. Representative processes are described in U.S. Pat. Nos. 4,681,612 and 5,529,411.

Finally, the option to apply the inventors' general process teachings to the separation of ethylene from nitrogen, rather than methane from nitrogen, is disclosed in U.S. Pat. No. 5,669,958. By analogy, it is also possible to apply the teachings of the present application to the separation of ethylene from nitrogen. A situation where this is likely to be of particular benefit is in the manufacturing of polyolefins, such as polyethylene and polypropylene.

In a typical polymerization process, the raw polymer product contains significant amounts of unreacted monomer, and may contain small amounts of solvents, catalysts, stabilizers, other hydrocarbons or any other materials, depending on the manufacturing process used. To remove these contaminants, the raw polymer resin is passed to large bins, where nitrogen is used to purge them out. The vent gas from this step contains nitrogen, olefin monomer, and other process-specific materials. To give just two specific examples, if nitrogen is used for purging and the purge vent stream comes from a gas-phase polypropylene manufacturing process, this stream might consist mostly of unreacted propylene and nitrogen, with small amounts of ethylene and other hydrocarbons. On the other hand, it is not uncommon for a purge vent stream from slurry or solution polyethylene manufacturing to contain, in addition to ethylene and nitrogen, significant amounts of ethane, methane, hydrogen, oxygen, and/or $C_3$–$C_6$ hydrocarbons. Co-owned U.S. Pat. No. 5,769,927 describes a process including a condensation step, a membrane separation step and a flash evaporation step to treat such a purge stream to recover unreacted monomer.

An alternative treatment process could follow the scheme of FIG. 1. As an example, suppose the raw purge stream from a polypropylene manufacturing plant contained a mixture of about 80–90% total propylene and nitrogen, the rest being a few percent each of ethylene, propane and $C_{4+}$ hydrocarbons and water vapor. In this case, the process of the invention could include a dehydration step, as unit 2 in FIG. 1, followed by a $C_{3+}$ hydrocarbon removal step (employing condensation, or a condensation/membrane separation hybrid step, as in U.S. Pat. No. 5,199,962) as unit 5 in FIG. 1. The raw condensate recovered from this step could be fractionated into a propylene monomer overhead stream, for return to the polymerization step, and a heavier hydrocarbon liquid. The gas remaining as stream 8 would contain mostly just ethylene and nitrogen. Step 9 could be used to separate the ethylene from the nitrogen, so that the nitrogen could be reused without building up excess ethylene in the polymerization loop.

The invention is now further illustrated by the following examples, which are intended to be illustrative of the best mode of carrying out the invention, but are not intended to limit the scope or underlying principles of the invention in any way.

EXAMPLES

Example 1

Preparation of Silicone Rubber Membrane

A microporous support membrane was dip-coated in a 6% dimethyl siloxane solution at 1 ft/min coating speed, then dried in an oven at 60° C. to crosslink the membrane. The resulting membranes had a nominal selective layer thickness of 20 μm. Samples of the finished composite membrane were cut into 12.6 cm$^2$ stamps and tested in a permeation test-cell apparatus with pure oxygen and pure nitrogen at 23° C. feed temperature and 50 psig feed pressure. The gas fluxes of the membranes were measured, and the oxygen/nitrogen selectivities were calculated. Any membrane with a selectivity less than the intrinsic selectivity of the material was considered defective.

Example 2

Preparation of Pebax 2533 Membrane

Membranes were prepared as in Example 1, using a 5% Pebax 2533 polymer solution. The resulting membranes had a nominal selective layer thickness of 6 μm. Fluxes and selectivities of the finished membranes were calculated to test for integrity as in Example 1.

Example 3

Preparation of PTMSP Membrane

Films of PTMSP were prepared by hand-casting. A 2-wt % polymer solution in toluene was cast onto clean glass plates with a casting bar. After evaporation of the solvent, the films were removed from the glass plate by immersion in water and were dried in a vacuum oven at 80° C. The nominal thickness of the films was about 30 μm. Fluxes and selectivities of the finished films were calculated to test for integrity as in Example 1.

Example 4

Effect of Feed Temperature on Silicone Rubber Membrane

Figure 6:
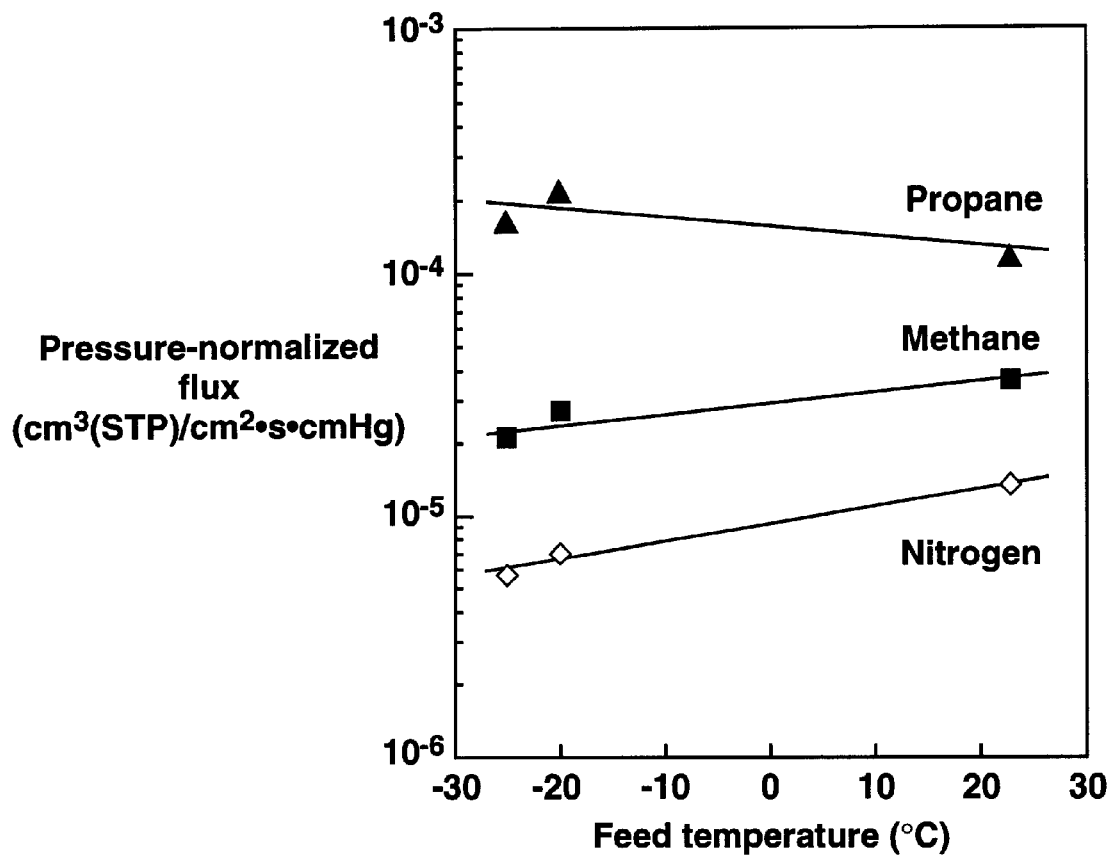
FIG. 6 is a graph of pressure-normalized flux as a function of feed temperature for permeation of propane, methane and nitrogen through a silicone rubber membrane.
Figure 7:
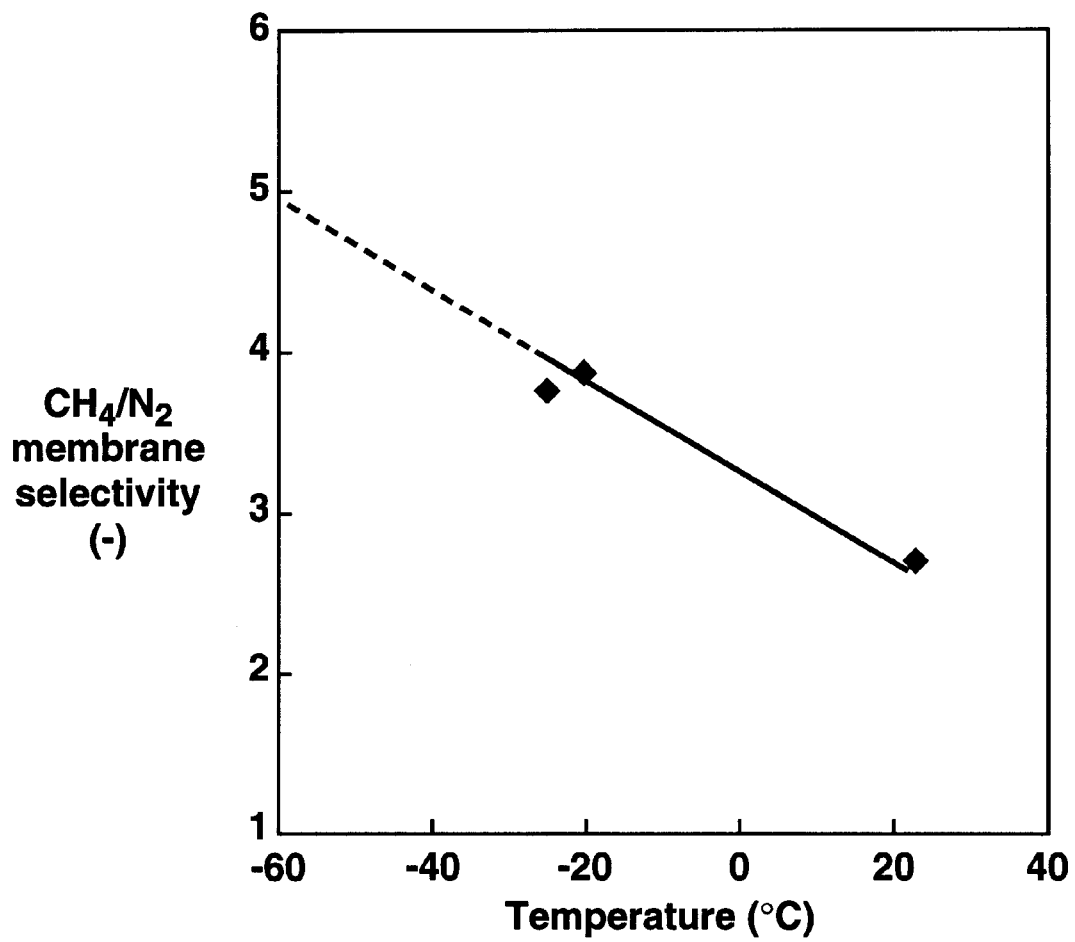
FIG. 7 is a graph of methane/nitrogen selectivity as a function of feed temperature for a silicone rubber membrane.

An experiment was carried out to determine the performance of a silicone rubber membrane at different temperatures. Membranes were prepared as in Example 1. The silicone rubber composite membrane was cut into 12.6-cm$^2$ stamps, and subjected to permeation tests following the general procedure as described in Example 1, using a model natural gas mixture containing 87% methane, 10% nitrogen, and 3% propane at three feed temperatures, -26° C., -10° C., and 23° C. The low temperatures were obtained by immersing the test cell in a low-temperature recirculating chiller. Measurements were made at a feed pressure of 200 psia. The permeate side was maintained at atmospheric pressure. During each test, the feed, permeate, and residue compositions were analyzed by gas chromatography (GC). The pressure-normalized fluxes of propane, methane, and nitrogen, and the propane/nitrogen, propane/methane, and methane/nitrogen selectivities were calculated using an in-house computer program. Flux and selectivity results are shown in FIGS. 6 and 7.

The pressure-normalized fluxes of nitrogen and methane both decrease with decreasing temperature, because of a decrease in diffusion coefficient that exceeds the gain in solubility coefficient. For propane, a condensable gas, the increase in solubility is larger than the decrease in diffusion coefficient, resulting in a net increase in the pressure-normalized flux at lower temperatures.

The methane/nitrogen selectivity increased with decreasing temperature, from about 2.7 at 23° C., to about 4 at sub-ambient temperatures. As can be seen from FIG. 7, a selectivity of about 5 can be obtained at an operating temperature of about -60° C. This temperature is sufficiently above the glass-transition temperature of silicone rubber (-123° C.) that the selectivity is still increasing as temperature falls.

Example 5

Effect of Temperature on Pebax Membrane

Figure 8:
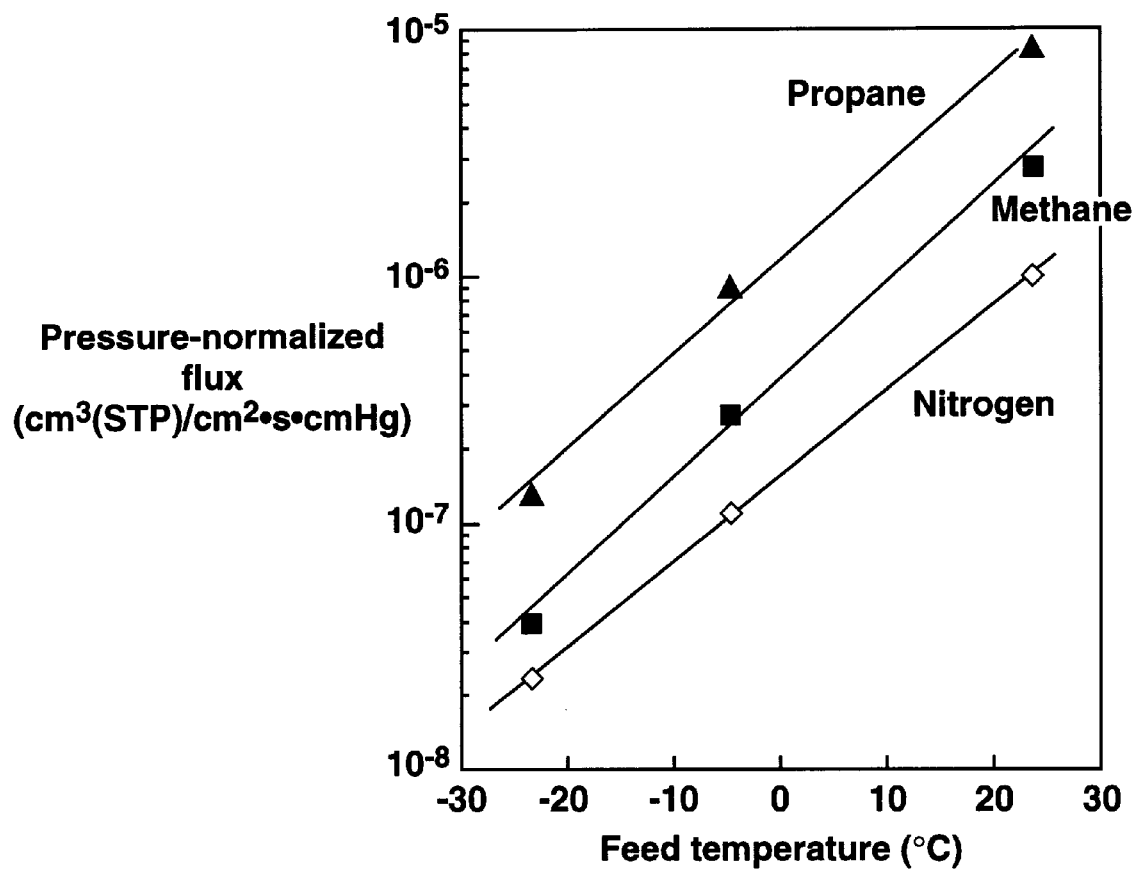
FIG. 8 is a graph of pressure-normalized flux as a function of feed temperature for permeation of propane, methane and nitrogen through a Pebax 2533 membrane.
Figure 9:
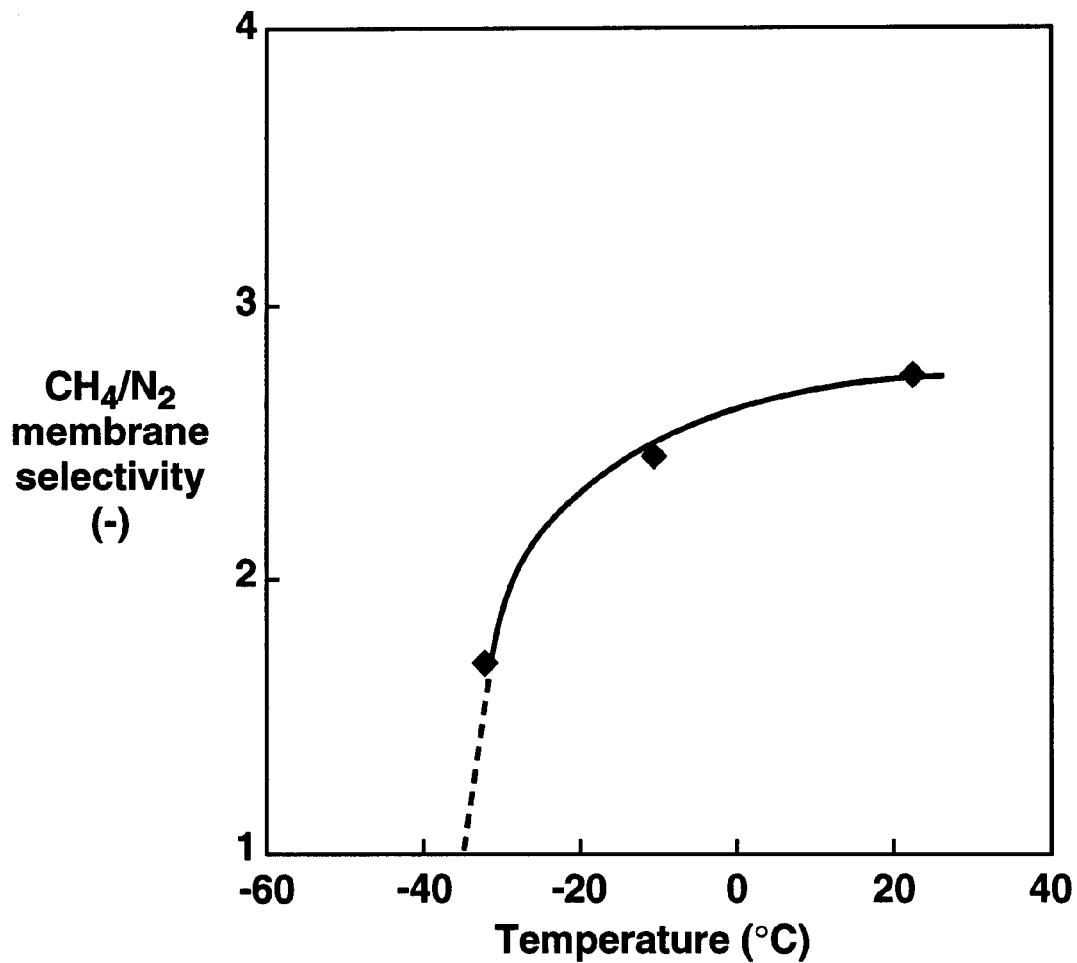
FIG. 9 is a graph of methane/nitrogen selectivity as a function of feed temperature for a Pebax 2533 membrane.

An experiment was carried out to determine the performance of a Pebax membrane at different temperatures. Pebax is a polyamide-polyether block copolymer that is rubbery at room temperature and that we believed to have a glass-transition temperature below -50° C. From earlier experiments, we knew that this material has a methane/nitrogen selectivity in the range 2-4 at room temperatures. Pebax membranes were prepared as in Example 2, and were subjected to mixed-gas permeation tests as in Example 4. The pressure-normalized fluxes of propane, methane, and nitrogen, and the propane/nitrogen, propane/methane, and methane/nitrogen selectivities, were calculated using an in-house computer program. Flux and selectivity results are shown in FIGS. 8 and 9.

To our surprise, the pressure-normalized fluxes of all three components decrease with decreasing temperature, and the loss of methane permeability was more severe than the loss of nitrogen permeability. As a result, the methane/nitrogen selectivity decreased from close to 3 at room temperature to only about 1.8, and falling, at -30° C. This decrease must be due to the membrane becoming more glassy in character as the temperature falls. It appears that the glass-transition temperature of this polymer is probably around -40° C. or -50° C., and that even 30° C. or 40° C. above the transition, the "glassy", diffusion-controlled effects are beginning to dominate the solubility effects. This polymer is, therefore, not suitable for use in methane/nitrogen separation as described here and is outside the scope of the invention.

Example 6

Effect of Feed Temperature on PTMSP Films

Figure 10:
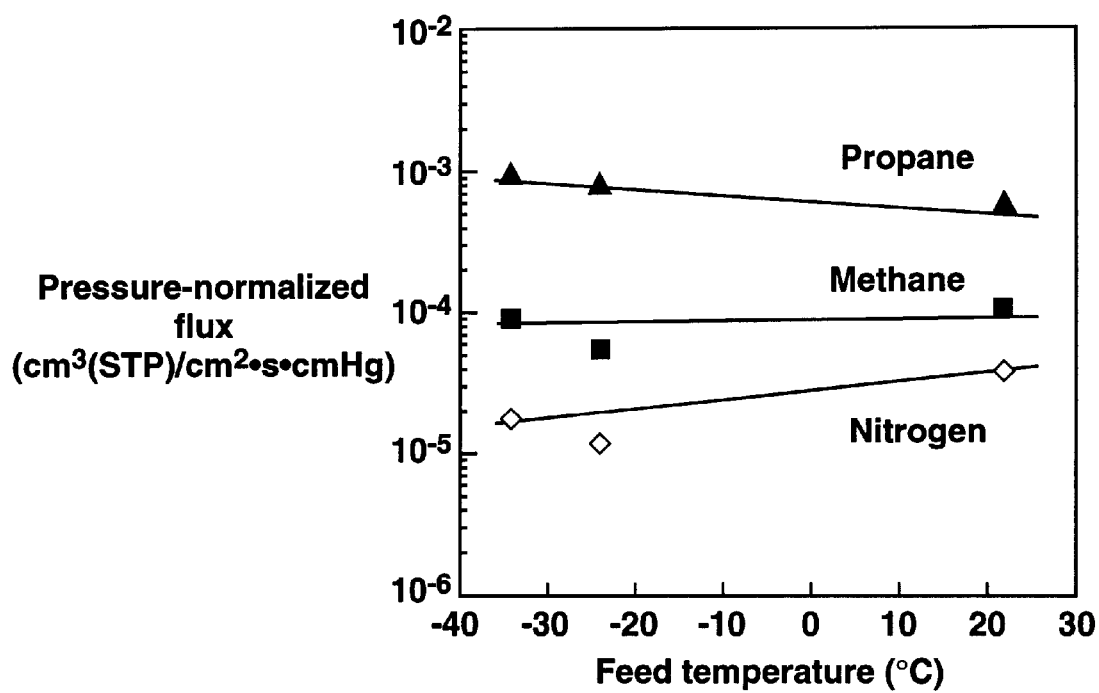
FIG. 10 is a graph of pressure-normalized flux as a function of feed temperature for permeation of propane, methane and nitrogen through a PTMSP membrane.
Figure 11:
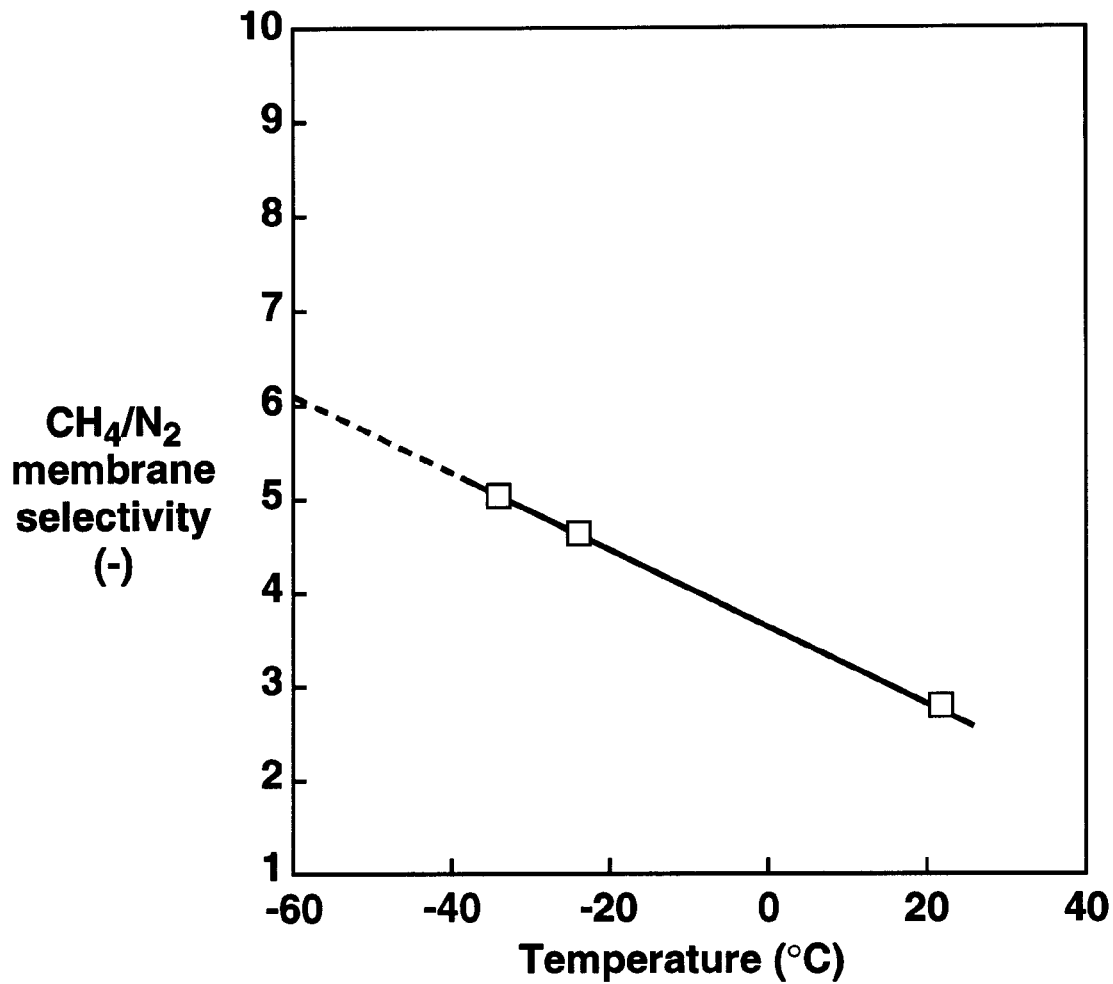
FIG. 11 is a graph of methane/nitrogen selectivity as a function of feed temperature for a PTMSP membrane.

An experiment was carried out to determine the performance of a PTMSP film at different temperatures. PTMSP films were prepared as in Example 3, and were subjected to mixed-gas permeation tests as in Example 4. These films were tested at temperatures of 23° C., -26° C. and -34° C. The pressure-normalized fluxes of propane, methane, and nitrogen, and the propane/nitrogen, propane/methane, and methane/nitrogen selectivities were calculated using an in-house computer program. Flux and selectivity results are shown in FIGS. 10 and 11.

The pressure-normalized flux of propane increases as the temperature falls. Propane is condensable and sorbs strongly into the free-volume of PTMSP, especially at lower temperatures. The methane flux remains fairly constant at about $1 \times 10^{-4}$ cm$^3$(STP)/cm$^2 \cdot$s$\cdot$cmHg over the temperature range. The nitrogen flux falls from about $4 \times 10^{-5}$ cm$^3$(STP)/cm$^2 \cdot$s$\cdot$cmHg to about $1.8 \times 10^{-5}$ cm$^3$(STP)/cm$^2 \cdot$s$\cdot$cmHg, resulting in a rise in selectivity from 2.8 at 23° C. to about 5 at -34° C. As can be seen from FIG. 11, lower temperatures would result in higher selectivities of 6 or more.

Example 7

A computer calculation was performed to illustrate the performance of the most preferred embodiment of the process of the invention, as outlined in FIG. 1, that is, a dehydration step 2, followed by an NGL removal step 5, followed by a methane/nitrogen membrane separation step 9. The calculation was performed using ChemCad III software (Chemstations Inc., Houston, Tex.) to model the process. The process as assumed for the calculation is shown, still in simplified form but in a little more detail, in FIG. 5. Referring to that figure, a natural gas mixture having the following composition:

| | |
|---|---|
| Methane | 75.2 mol % |
| Ethane | 9.8 mol % |
| Propane | 3.9 mol % |
| n-Butane | 2.0 mol % |
| n-Pentane | 1.0 mol % |
| Nitrogen | 8.0 mol % |
| Water | 0.1 mol % | was assumed to enter the process train via line 501 at a flow rate of 50 MMscfd, and at a pressure of 1,000 psia and a temperature of 35° C. The stream was assumed to pass first to dehydrator 502, assumed to be a TEG absorption unit followed by a molecular sieve. The waste streams from regeneration of the glycol and the sieve are indicated as stream 503. The natural gas mixture, now with a water

| | |
|---|---|
| Methane | $100 \times 10^{-6}$ cm$^3$ (STP)/cm$^2 \cdot$ sec $\cdot$ cmHg |
| Ethane | $200 \times 10^{-6}$ cm$^3$ (STP)/cm$^2 \cdot$ sec $\cdot$ cmHg |
| Propane | $1,000 \times 10^{-6}$ cm$^3$ (STP)/cm$^2 \cdot$ sec $\cdot$ cmHg |
| n-Butane | $2,000 \times 10^{-6}$ cm$^3$ (STP)/cm$^2 \cdot$ sec $\cdot$ cmHg |
| n-Pentane | $2,000 \times 10^{-6}$ cm$^3$ (STP)/cm$^2 \cdot$ sec $\cdot$ cmHg |
| Nitrogen | $20 \times 10^{-6}$ cm$^3$ (STP)/cm$^2 \cdot$ sec $\cdot$ cmHg |
| Water | $2,000 \times 10^{-6}$ cm$^3$ (STP)/cm$^2 \cdot$ s $\cdot$ cmHg. |

The methane-enriched permeate stream, that is, the product gas stream 512 is reduced to 4% nitrogen content, sufficiently low to meet pipeline specification. This gas was assumed to be mixed with streams 516 and 519, recompressed to 800 psia in compressor 521 and passed as stream 522 to a natural gas pipeline.

The membrane residue stream, 511, which now consists of about 60 mol % methane and 40 mol % nitrogen exits the process. Thus, as can be seen from the table below, the loss of methane in this stream is only about 370 lbmol/h, compared with a methane flow in the raw gas stream of about 4,400 lbmol/h.

The results of the calculation are summarized in Table 2.

TABLE 2

| | Stream | | | | | | | | |
|---|---|---|---|---|---|---|---|---|---|
| | 501 | 504 | 509 | 511 | 512 | 508 | 517 | 520 | 522 |
| Flow (lb mol/h) | 5,803 | 5,794 | 5,230 | 654.2 | 4,576 | 563.8 | 285.1 | 257.8 | 4,482 |
| Temp. (° C.) | 35 | 35 | −20 | −60 | −60 | −20 | −56 | −2 | 90 |
| Pressure (psia) | 1,000 | 1,000 | 1,000 | 990 | 100 | 1,000 | 100 | 100 | 800 |
| Component (mol %): | | | | | | | | | |
| Methane | 75.2 | 75.3 | 78.9 | 58.0 | 81.9 | 42.3 | 7.2 | 0.5 | 81.6 |
| Ethane | 9.8 | 9.8 | 8.8 | 1.0 | 9.9 | 19.0 | 22.7 | 22.5 | 10.3 |
| Propane | 3.9 | 3.9 | 2.6 | 0 | 3.0 | 15.7 | 28.6 | 31.2 | 3.0 |
| n-Butane | 2.0 | 2.0 | 0.8 | 0 | 0.9 | 12.8 | 25.1 | 27.7 | 0.9 |
| n-Pentane | 1.0 | 1.0 | 0.2 | 0 | 0.2 | 8.3 | 16.3 | 18.0 | 0.2 |
| Nitrogen | 8.0 | 8.0 | 8.7 | 41.1 | 4.0 | 1.9 | 0.1 | 0 | 4.0 |
| Water | 0.1 | 0 | 0 | 0 | 0 | 0 | 0 | 0 | 0 | content of only 7 ppm, exits via line 504, and is passed to cooling section 505. Cooling was assumed to be provided by heat exchange against the expanded, cooled membrane residue stream 511, optionally supplemented by external refrigeration, to lower the temperature of stream 506 to −20° C., both to condense $C_{3+}$ hydrocarbons and to carry out the methane/nitrogen membrane separation step.

The NGL removal step was assumed to be performed by separating the raw condensate liquid, stabilizing it by pressure reduction/flashing, and passing the remaining liquid through a demethanizer column to remove the remaining light components. Thus, cooled stream 506 is separated into gaseous fraction 509 and liquid fraction 508 in separator 507. The raw condensate 508 is let down in pressure from 1,000 psia to 100 psia, through valve 513, and passes as stream 514 into flash tank 515. The gas that is flashed off, stream 516, comprises mostly methane and ethane, and was assumed to be added to the product gas line 522. The stabilized liquid, stream 517, then passes to demethanizer 518. The light overhead stream, 519, again containing mostly methane and ethane, was again assumed to be added to the product gas line. As a result of the NGL removal step, about 70,000 gpd of NGL product is recovered as stream 520.

The gas exiting the NGL removal step, stream 509, passes to the membrane separation unit 510. The unit was assumed to contain silicone rubber membranes or the like, exhibiting the following pressure-normalized fluxes:

Example 8

A calculation was performed to illustrate the performance of a hybrid process that combines membrane separation with cryogenic separation, as in FIG. 4. The process was assumed to be treating a gas mixture of 50 MMscfd natural gas at 1,000 psia. The composition of the gas was chosen to represent either a good quality natural gas (except for nitrogen content) or a gas that has already been pretreated, such as by amine absorption to reduce acid gas content and/or by glycol dehydration to reduce water vapor content.

The membrane separation step was assumed to be carried out at −30° C., using a composite membrane with a siloxane rubber selective layer. The selectivities of the various gas components with respect to nitrogen at that temperature, and the transmembrane pressure-normalized fluxes, were assumed to be as shown in Table 3.

TABLE 3

| Component | Flux ($10^{-6}$ cm$^3$ (STP)/cm$^2 \cdot$ s $\cdot$ cmHg) | Selectivity (Gas/N$_2$) |
|---|---|---|
| CH$_4$ | 500 | 5 |
| N$_2$ | 100 | 1 |
| CO$_2$ | 1,500 | 15 |
| H$_2$S | 2,500 | 25 |
| C$_4$ | 1,600 | 16 |
| C$_6$ | 4,000 | 40 |
| H$_2$O | 5,000 | 50 |

The pressure on the permeate side of the membrane was assumed to be 20 psia. The calculations were carried out using a custom-designed in-house computer modeling program, based on cross-flow configuration in a spiral-wound membrane module. The membrane area needed to perform the separation was calculated to be 270 m². The stream compositions as calculated are given in Table 4.

TABLE 4

| Gas content (vol %) | Stream number (FIG. 4) | | | | | Remixed gas 44 + 46 |
|---|---|---|---|---|---|---|
| | 42 | 43 | 44 | 47 | 46 | |
| $CH_4$ | 75.0 | 70.2 | 83.1 | — | 98.2 | 88.3 |
| $N_2$ | 20.0 | 28.5 | 5.5 | 100 | — | 2.5 |
| $CO_2$ | 0.025 | 0.0087 | 0.053 | — | 0.012 | 0.029 |
| $H_2S$ | 0.0002 | — | 0.0005 | — | — | 0.0002 |
| $C_4$ | 4.0 | 1.27 | 8.67 | — | 1.78 | 4.7 |
| $C_6$ | 1.0 | 0.041 | 2.64 | — | 0.057 | 1.2 |
| $H_2O$ | 0.010 | 0.0002 | 0.027 | — | 0.0002 | 0.012 |
| Flow (1,000 scfm) | 34.7 | 21.9 | 12.8 | 6.2 | 15.7 | 28.5 |

— means less than 0.0001 or none

As can be seen from the table:

Stream 43, the residue stream from the membrane separation step, contains 2 ppm water vapor, less than 1 ppm hydrogen sulfide and 87 ppm carbon dioxide. This stream needs no additional treatment before it can be sent to the cryogenic unit.

The flow rate of stream 43 is 63% of the flow rate of stream 42. The cryogenic unit can, therefore, treat 50% more gas than would be possible in the absence of the membrane unit.

Stream 44 contains 5.5% nitrogen. This is above pipeline specification. When stream 44 is mixed with stream 46 from the cryogenic unit, however, the result is a stream that meets pipeline specification. No methane whatsoever has been lost in this process and the only secondary product is the clean nitrogen stream from the top of the cryogenic distillation column.

The stage-cut of the membrane process is 37% (12.8/34.7).

Example 9

Two-stage system design

We performed a calculation to illustrate the performance of the processes of the invention as carried out using a two-stage membrane system. The layout of the system was assumed to be as shown in FIG. 3. The feed gas to be treated was assumed to have a composition of 20% nitrogen and 80% methane and a flow rate of 10,000 scfm, and to be at a pressure of 200 psia. This gas composition is assumed to be too concentrated in nitrogen to be brought to pipeline specification (4% nitrogen) in a single-stage system without an acceptable methane loss. The calculation was performed based on a transmembrane pressure-normalized nitrogen flux of $1 \times 10^{-4}$ cm³(STP)/cm²·s·cmHg and a methane/nitrogen selectivity of 5. The permeate pressure for each membrane stage was assumed to be 20 psia. The stream compositions and flow rates, following the numbering of FIG. 3, are given in Table 5.

TABLE 5

| Gas content (vol %) | Stream number (FIG. 3) | | | | | |
|---|---|---|---|---|---|---|
| | 310 | 311 | 313 | 312 | 317 | 316 |
| Nitrogen | 20.0 | 21.9 | 10.9 | 60.0 | 4.0 | 28.0 |
| Methane | 80.0 | 78.2 | 89.1 | 40.0 | 96.0 | 72.0 |
| Flow (scfm) | 10,000 | 12,840 | 9,990 | 2,855 | 7,150 | 2,840 |

The process design of FIG. 3 achieves a permeate product stream, 317, containing 4% nitrogen, which can be recompressed to pipeline pressure. Residue stream 312 contains 40% methane and has a flow rate of 2,858 scfm. Thus, the process achieves about 86% methane recovery, or 14% methane loss. This design uses a total membrane area of 1,800 m² and requires a compressor, 314, capacity of 3,100 hp, assuming 33% compressor efficiency.

I claim:

1. A treatment process for a gas stream comprising methane, nitrogen, water and $C_{3+}$ hydrocarbons, comprising the following steps:
    (a) removing at least a portion of said water from said gas stream to produce a drier gas stream;
    (b) removing at least a portion of said $C_{3+}$ hydrocarbons from said drier gas stream to produce a lighter gas stream;
    (c) providing a membrane having a feed side and a permeate side and being selective for methane over nitrogen;
    (d) passing said lighter gas stream across said feed side at a temperature no higher than about 0° C.;
    (e) withdrawing from said feed side a residue stream depleted in methane and enriched in nitrogen compared with said lighter gas stream;
    (f) withdrawing from said permeate side a permeate stream enriched in methane and depleted in nitrogen compared with said lighter gas stream.

2. The process of claim 1, wherein said temperature is no higher than about −20° C.

3. The process of claim 1, wherein said temperature is no lower than about −40° C.

4. The process of claim 1, wherein said membrane comprises a rubbery polymer.

5. The process of claim 1, wherein said membrane comprises a rubbery polymer having a glass transition temperature below about −50° C.

6. The process of claim 1 wherein said membrane comprises silicone rubber.

7. The process of claim 1, wherein said membrane comprises a substituted polyacetylene.

8. The process of claim 1, wherein said membrane comprises an inorganic membrane.

9. The process of claim 1, wherein said membrane comprises a carbon membrane.

10. The process of claim 1, wherein said membrane exhibits a selectivity for methane over nitrogen of at least about 4.

11. The process of claim 1, wherein said membrane exhibits a selectivity for methane over nitrogen of at least about 5.

12. The process of claim 1, wherein said membrane exhibits a transmembrane methane pressure-normalized flux of at least about $1 \times 10^{-4}$ cm³(STP)/cm²·s·cmHg.

13. The process of claim 1, wherein at least a portion of said residue stream is used to cool at least one of said gas stream, said drier gas stream and said lighter gas stream.

14. The process of claim 1, wherein at least a portion of said permeate stream is used to cool at least one of said gas stream, said drier gas stream and said lighter gas stream.

15. The process of claim 1, wherein no more than about 50% of said methane that is in said gas stream remains in said residue stream.

16. The process of claim 1, wherein no more than about 25% of said methane that is in said gas stream remains in said residue stream.

17. The process of claim 1, wherein no more than about 10% of said methane that is in said gas stream remains in said residue stream.

18. The process of claim 1, wherein said step (a) is carried out at least partially by absorption of water into glycol.

19. The process of claim 1, wherein said step (a) is carried out at least partially by membrane separation.

20. The process of claim 1, wherein said step (a) is carried out at least partially by adsorption of water.

21. The process of claim 1, wherein said step (a) is carried out at least partially by adsorption of water onto a molecular sieve.

22. The process of claim 1, wherein said step (b) is carried out at least partially by condensation of at least a portion of said $C_{3+}$ hydrocarbons.

23. The process of claim 1, wherein said step (b) is carried out at least partially by membrane separation.

24. The process of claim 1, further comprising the following step:

(g) passing said residue stream to a cryogenic separation process for further separation of nitrogen from methane.

25. The process of claim 1, further comprising the following step:

(g) passing said permeate stream to an additional treatment step for additional removal of at least one of water and $C_{3+}$ hydrocarbons.

26. The process of claim 1, wherein said gas stream further comprises an acid gas and wherein said process further comprises removing at least a portion of said acid gas prior to said step (d).

27. A gas-treating apparatus comprising:

(a) a dehydration unit adapted to separate water from a gas stream containing water;

(b) an NGL removal unit adapted to separate $C_{3+}$ hydrocarbons from a gas stream containing $C_{3+}$ hydrocarbons, and connected in gas-transferring relationship to said dehydration unit, so that gas can flow out of said dehydration unit and into said NGL removal unit;

(c) a membrane separation unit containing a membrane selective for methane over nitrogen, whereby nitrogen can be separated from methane, and connected in gas-transferring relationship to said NGL removal unit so that gas can flow out of said NGL removal unit and into said membrane separation unit.

28. The apparatus of claim 27, wherein said dehydration unit operates by absorption of water into glycol.

29. The apparatus of claim 27, wherein said dehydration unit contains a molecular sieve.

30. The apparatus of claim 27, wherein said dehydration unit comprises a water-selective membrane.

31. The apparatus of claim 27, wherein said NGL removal unit comprises a condensation unit.

32. The apparatus of claim 27, wherein said NGL removal unit comprises a $C_{3+}$ hydrocarbon-selective membrane.

33. The apparatus of claim 27, wherein said membrane separation unit comprises a rubbery membrane.

34. The apparatus of claim 27, further comprising an acid gas removal unit adapted to separate at least one of the acid gases carbon dioxide and hydrogen sulfide from a gas stream containing acid gas, and connected in gas-transferring relationship to said dehydration unit, so that gas can flow between said dehydration unit and said acid gas removal unit.

35. The apparatus of claim 34, wherein said acid gas removal unit comprises an amine absorption unit.

36. The apparatus of claim 34, wherein said acid gas removal unit comprises a membrane separation unit.

\* \* \* \* \*